US007505036B1

(12) United States Patent
Baldwin

(10) Patent No.: US 7,505,036 B1
(45) Date of Patent: Mar. 17, 2009

(54) ORDER-INDEPENDENT 3D GRAPHICS BINNING ARCHITECTURE

(75) Inventor: David Baldwin, Weybridge (GB)

(73) Assignee: 3DLabs Inc. Ltd., Hamilton (BM)

( * ) Notice: Subject to any disclaimer, the term of this patent is extended or adjusted under 35 U.S.C. 154(b) by 589 days.

(21) Appl. No.: 10/903,193

(22) Filed: Jul. 30, 2004

(51) Int. Cl.
*G06T 15/40* (2006.01)
*G06T 15/00* (2006.01)
*G06F 13/00* (2006.01)

(52) U.S. Cl. .................. 345/421; 345/419; 345/536

(58) Field of Classification Search .......... 345/421, 345/419, 418, 501, 611, 581, 530, 536
See application file for complete search history.

(56) References Cited

U.S. PATENT DOCUMENTS 6,344,852 B1   2/2002   Zhu
6,664,959 B2 * 12/2003 Duluk et al. ............... 345/422
2001/0028354 A1 * 10/2001 Cheng et al. ............... 345/531
2002/0118202 A1 *  8/2002 Baldwin .................... 345/530

OTHER PUBLICATIONS

Everitt, Cass. "Interactive Order-Independent Trasnparency." May 15, 2001. http://developer.nvidia.com/object/Interactive_Order_Transparency.html.*

* cited by examiner

*Primary Examiner*—Kee M Tung
*Assistant Examiner*—Joni Hsu
(74) *Attorney, Agent, or Firm*—Groover & Associates

(57) ABSTRACT

A binning architecture that allows opaque and transparent primitives to be segregated automatically into pairs of bins covering the same bin rectangle on the screen. When the frame is complete, the opaque bin will be rendered first and then the transparent bin will be rendered repeatedly using the depth peeling algorithm until all the layers have been resolved. This will happen automatically without requiring the application to isolate and store the transparent primitives until all of the opaque primitives have been rendered or submit the transparent primitives repeated until all of the transparent layers have been resolved.

59 Claims, 16 Drawing Sheets

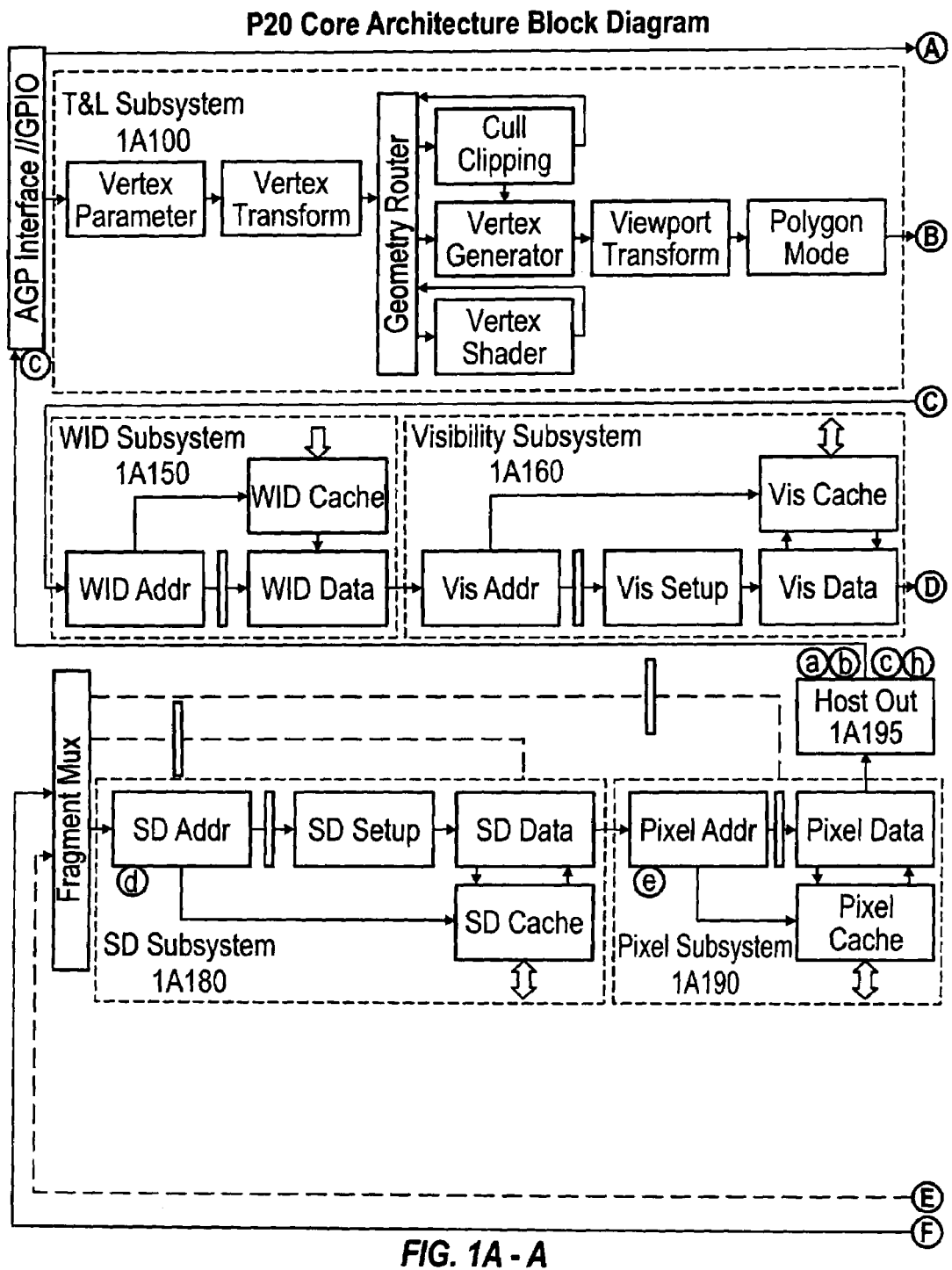
FIG. 1A - A

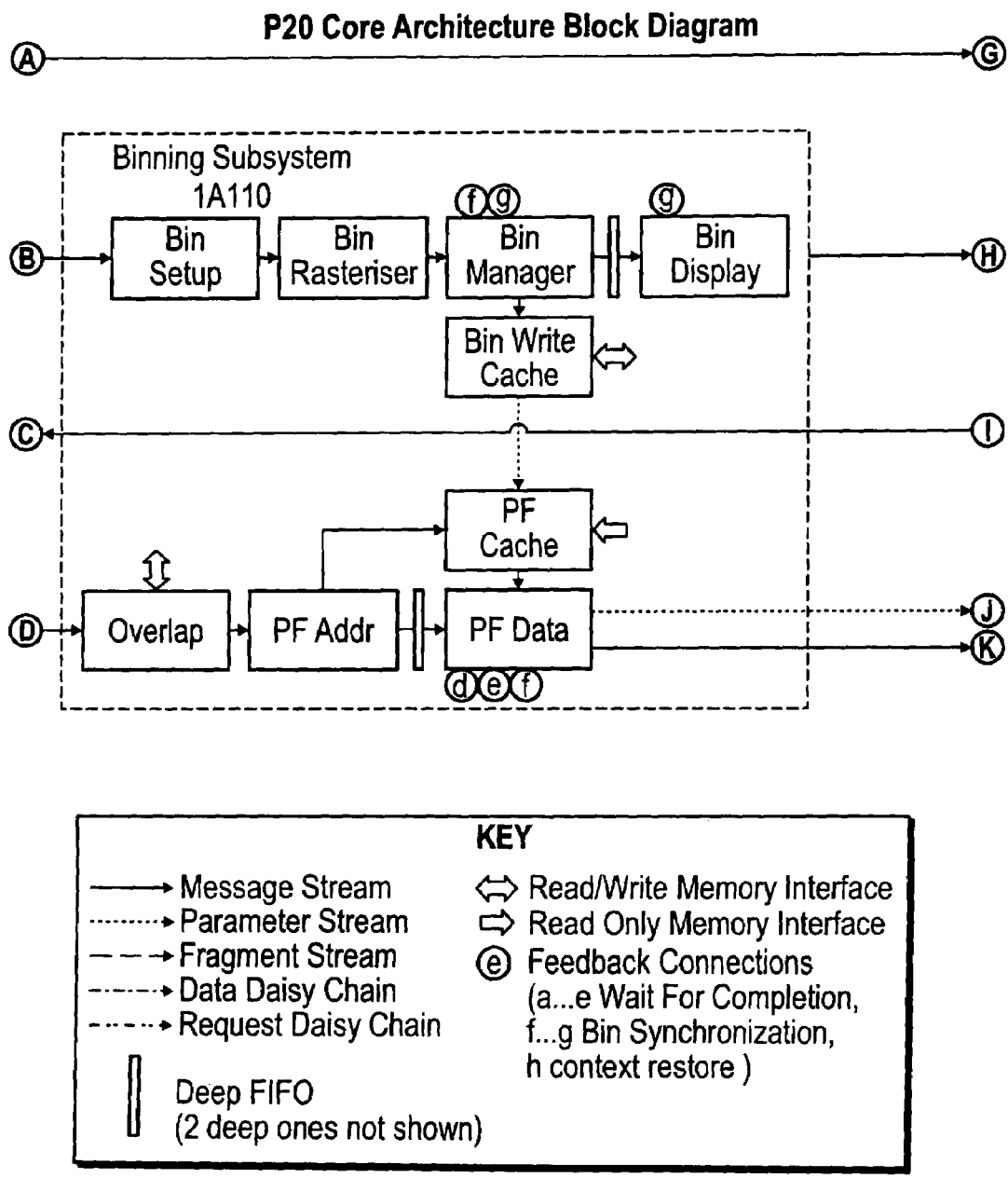
FIG. 1A - B

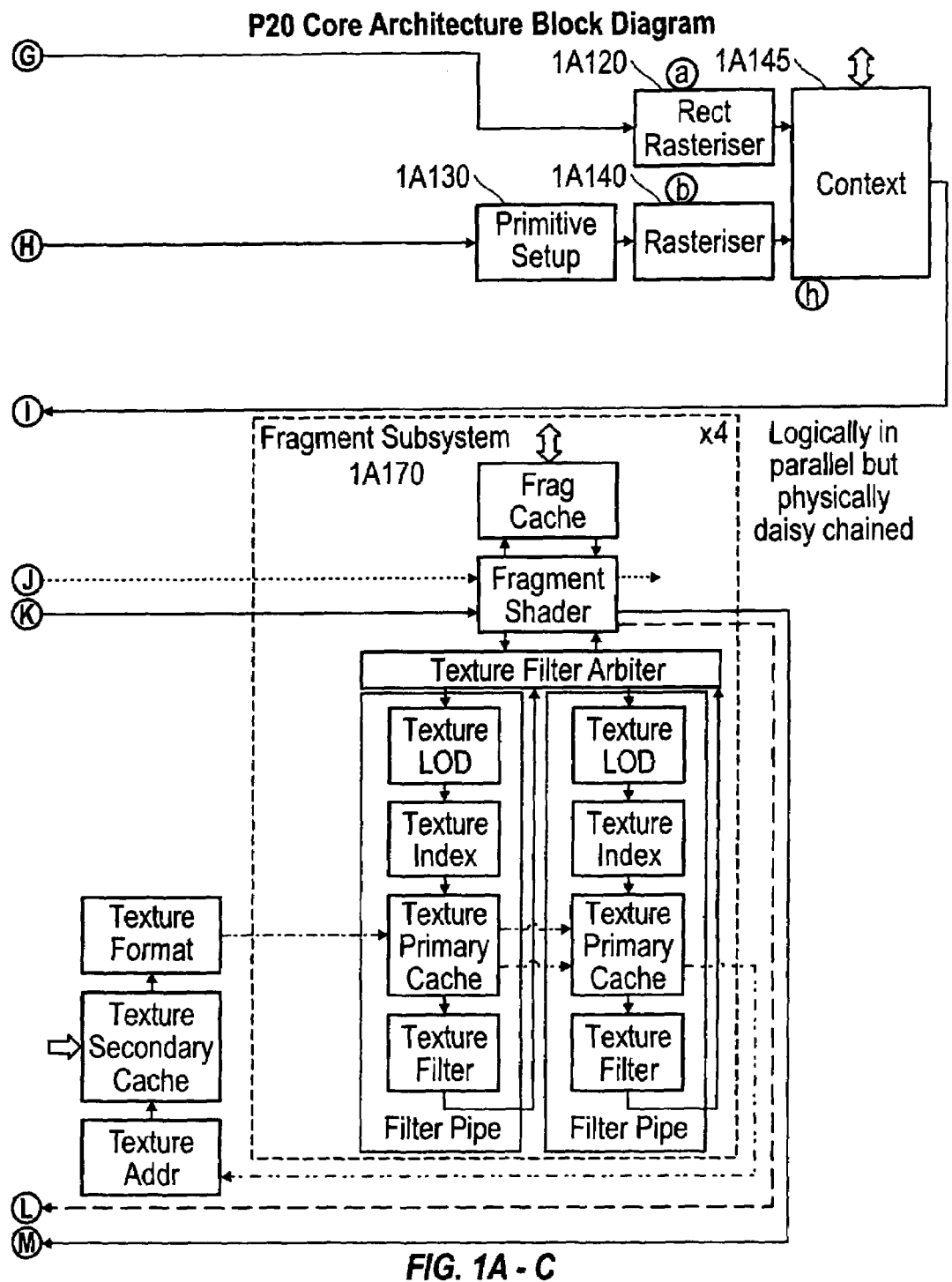
FIG. 1A - C

ORDER-INDEPENDENT 3D GRAPHICS BINNING ARCHITECTURE

FIELD OF THE INVENTION

The present inventions relate to computer graphics and, more particularly, to a computer graphics rendering architecture that segregates transparent primitives from opaque primitives prior to rendering.

BACKGROUND AND SUMMARY OF THE INVENTION

Background: 3D Computer Graphics

One of the driving features in the performance of most single-user computers is computer graphics. This is particularly important in computer games and workstations, but is generally very important across the personal computer market.

For some years, the most critical area of graphics development has been in three-dimensional ("3D") graphics. The peculiar demands of 3D graphics are driven by the need to present a realistic view, on a computer monitor, of a three-dimensional scene. The pattern written onto the two-dimensional screen must, therefore, be derived from the three-dimensional geometries in such a way that the user can easily "see" the three-dimensional scene (as if the screen were merely a window into a real three-dimensional scene). This requires extensive computation to obtain the correct image for display, taking account of surface textures, lighting, shadowing, and other characteristics.

The starting point (for the aspects of computer graphics considered in the present application) is a three-dimensional scene, with specified viewpoint and lighting (etc.). The elements of a 3D scene are normally defined by sets of polygons (typically triangles), each having attributes such as color, reflectivity, and spatial location. (For example, a walking human, at a given instant, might be translated into a few hundred triangles which map out the surface of the human's body.) Textures are "applied" onto the polygons, to provide detail in the scene. (For example, a flat, carpeted floor will look far more realistic if a simple repeating texture pattern is applied onto it.) Designers use specialized modelling software tools, such as 3D Studio, to build textured polygonal models.

The 3D graphics pipeline consists of two major stages, or subsystems, referred to as geometry and rendering. The geometry stage is responsible for managing all polygon activities and for converting three-dimensional spatial data into a two-dimensional representation of the viewed scene, with properly-transformed polygons. The polygons in the three-dimensional scene, with their applied textures, must then be transformed to obtain their correct appearance from the viewpoint of the moment; this transformation requires calculation of lighting (and apparent brightness), foreshortening, obstruction, etc.

However, even after these transformations and extensive calculations have been done, there is still a large amount of data manipulation to be done: the correct values for EACH PIXEL of the transformed polygons must be derived from the two-dimensional representation. (This requires not only interpolation of pixel values within a polygon, but also correct application of properly oriented texture maps.) The rendering stage is responsible for these activities: it "renders" the two-dimensional data from the geometry stage to produce correct values for all pixels of each frame of the image sequence.

The most challenging 3D graphics applications are dynamic rather than static. In addition to changing objects in the scene, many applications also seek to convey an illusion of movement by changing the scene in response to the user's input. Whenever a change in the orientation or position of the camera is desired, every object in a scene must be recalculated relative to the new view. As can be imagined, a fast-paced game needing to maintain a high frame rate will require many calculations and many memory accesses.

Background: Texturing

There are different ways to add complexity to a 3D scene. Creating more and more detailed models, consisting of a greater number of polygons, is one way to add visual interest to a scene. However, adding polygons necessitates paying the price of having to manipulate more geometry. 3D systems have what is known as a "polygon budget," an approximate number of polygons that can be manipulated without unacceptable performance degradation. In general, fewer polygons yield higher frame rates.

The visual appeal of computer graphics rendering is greatly enhanced by the use of "textures". A texture is a two-dimensional image which is mapped into the data to be rendered. Textures provide a very efficient way to generate the level of minor surface detail which makes synthetic images realistic, without requiring transfer of immense amounts of data. Texture patterns provide realistic detail at the sub-polygon level, so the higher-level tasks of polygon-processing are not overloaded. See Foley et al., Computer Graphics: Principles and Practice (2.ed. 1990, corr. 1995), especially at pages 741-744; Paul S. Heckbert, "Fundamentals of Texture Mapping and Image Warping," Thesis submitted to Dept. of EE and Computer Science, University of California, Berkeley, Jun. 17, 1994; Heckbert, "Survey of Computer Graphics," IEEE Computer Graphics, November 1986, pp. 56; all of which are hereby incorporated by reference. Game programmers have also found that texture mapping is generally a very efficient way to achieve very dynamic images without requiring a hugely increased memory bandwidth for data handling.

A typical graphics system reads data from a texture map, processes it, and writes color data to display memory. The processing may include mipmap filtering which requires access to several maps. The texture map need not be limited to colors, but can hold other information that can be applied to a surface to affect its appearance; this could include height perturbation to give the effect of roughness. The individual elements of a texture map are called "texels".

Awkward side-effects of texture mapping occur unless the renderer can apply texture maps with correct perspective. Perspective-corrected texture mapping involves an algorithm that translates "texels" (pixels from the bitmap texture image) into display pixels in accordance with the spatial orientation of the surface. Since the surfaces are transformed (by the host or geometry engine) to produce a 2D view, the textures will need to be similarly transformed by a linear transform (normally projective or "affine"). (In conventional terminology, the coordinates of the object surface, i.e. the primitive being rendered, are referred to as an (s,t) coordinate space, and the map of the stored texture is referred to a (u,v) coordinate space.) The transformation in the resulting mapping means that a horizontal line in the (x,y) display space is very likely to correspond to a slanted line in the (u,v) space of the texture map, and hence many additional reads will occur, due to the texturing operation, as rendering walks along a horizontal line of pixels.

One of the requirements of many 3-D graphics applications (especially gaming applications) is fill and texturing rates.

Gaming and DCC (digital content creation) applications use complex textures, and may often use multiple textures with a single primitive. (CAD and similar workstation applications, by contrast, make much less use of textures, and typically use smaller polygons but more of them.) Achieving an adequately high rate of texturing and fill operations requires a very large memory bandwidth.

Background: Binning

A tiled, binning, chunking, or bucket rendering architecture is where the primitives are sorted into screen regions before they are rendered. This architecture allows all the primitives within a screen region to be rendered together to exploit the higher locality of reference to the z and color buffers, thereby allowing more efficient memory usage typically by using only on-chip memory. This also enables other whole-scene rendering opportunities such as deferred-rendering, order-independent transparency, and new types of antialiasing. In the present application, "transparent" is generally used to designate anything with alpha <1.

The primitives and state are recorded in a spatial database in memory that represents the frame being rendered. This is done after any T&L processing so everything is in screen coordinates. Ideally, no rendering occurs until the frame is complete; however, it will be done early on a user flush if the amount of binned data exceeds a programmable threshold or if the memory set aside to hold the database is exhausted. While the database for one frame is being constructed, the database for an earlier frame will be rendered.

The screen is divided up into rectangular regions called bins, and each bin heads a linked list of bin records that hold the state and primitives that overlap with this bin region. A primitive and its associated state may be repeated across several bins. Vertex data is held separately and is not replicated when a primitive overlaps multiple bins to allow more efficient storage mechanisms to be used. Primitives are maintained in temporal order within a bin.

Opaque primitives can be rendered in any order and are usually rendered in the order the primitives are submitted. Generally, the depth test ensures that the final result is the same. However, different rendering orders of co-planar polygons will give different results.

To render transparent primitives correctly, they need to be drawn either in a front-to-back or back-to-front order after all the opaque primitives have been rendered. The application sorts the transparent primitives into order before submitting them for rendering, and there are two basic algorithms used:

The application can sort the transparent primitives in a manner similar to the Painter's algorithm (an early method for hidden surface removal). There may be no correct rendering order when transparent primitives are cyclically interleaved or penetrated, and in these cases, the application would need to clip the primitives against each other to generate a definitive order.

The application can submit the transparent primitives multiple times with a dual depth test to render the transparent surfaces one layer at a time. A layer is the set of farthest transparent primitives (or parts there of) that are in front of the nearest opaque primitives. After each layer is rendered, it is incorporated into the opaque primitives for the next pass. Subsequent layers move closer to the eye position. This technique is called depth peeling. Alternatively, it can be implemented with subsequent layers moving farther away from the eye; however, this requires a triple depth test and is more expensive to render, but has the advantage of terminating early once a certain number of layers has been rendered (extra layers add very little to the fidelity of the image).

Binning has the following benefits:

Reduces the rendering bandwidth by keeping all the depth and color data on-chip except for the final write to memory once a bin has been processed. For aliased rendering, the frame buffer bandwidth is, therefore, a constant one-pixel write per frame irrespective of overdraw or the amount of alpha-blending or depth read-modify-write operations. Also, note that in many cases, there is no need to save the depth buffer to memory, thereby halving the bandwidth. For full scene antialiasing (FSAA), this is even more dramatic as approximately 4× more reads and writes occur while rendering (assuming 4-sample FSAA). The down-sampling also is done from on-chip memory so the bandwidth demand remains the same as in the non-FSAA case. Some of these bandwidth savings are lost due to the bandwidth needed to build and parse the bin data structures, and this will be exacerbated with FSAA as the caches will cover a smaller area of screen (the database will be traversed more times). The over all bandwidth saving is scene and triangle-size dependent.

Fragment computations or texturing is saved by using deferred rendering. A bin is traversed twice—on the first (but simpler pass), the visibility buffer is set up, and no color calculations are done. On the second pass, only those fragments determined to be visible are rendered— effectively reducing the opaque depth complexity to 1. As most games have an average depth complexity >3, this can give up to a 3× or more boost to the apparent fill rate (depending on the original primitive submission order).

Less FSAA work. During the first pass of the deferred rendering operation, the location of edges (geometric and inferred due to penetrating faces) can be ascertained, and only those sub-tiles holding edges need to have the multi-sample depth values calculated and the color replicated to the covered sample points. This saves cycles to update the multi-sample buffers and any program cost for alpha-blending.

Stochastic super sampling FSAA. The contents of a bin are rendered multiple times with the post-transformed primitives being jittered per pass. This is similar to accumulation buffering at the application level but occurs without any application involvement (motion blur and depth of field effects cannot be done). It has superior quality and smaller memory footprint than multi-sample FSAA; however, it is slower as the color is computed at each sample point (unlike multi-sample where one color per fragment is calculated).

The T&L and rasterisation work proceed in parallel with no fine grain dependencies so a bottle neck in one part will not stall the other. This will still happen at frame granularity, but within a frame, the work flow will be much smoother.

Memory footprint can be reduced when the depth buffer does not need to be saved to memory. With FSAA, the depth and color sample buffers are rarely needed after the filtered color has been determined. Note that as all the memory is virtual, space can be allocated for these buffers (in case of a premature flush), but the demand will only be made on the working set if a flush occurs. Note that the semantics of OpenGL can make this hard to use.

Order—Independent 3D Graphics Binning Architecture

The present application describes a new kind of binning architecture, where each bin region has a pair of bin buffers— one holds the opaque primitives, and the other holds the transparent primitives. After the opaque bin is rendered, the transparent bin is rendered multiple times until all the transparency layers have been resolved. The layers are preferably resolved in a back-to-front order, and successive layers touch fewer and fewer fragments.

In addition to the above-listed advantages, the disclosed innovations, in various embodiments, also provide one or more of at least the following advantages:

Multiple passes are not used on the opaque primitives.
The primitives do not need to be ordered by the application.
Increased speed.
Increased efficiency.
Optimal handling of scenes which contain more opaque primitives than non-opaque primitives.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 1A is a block diagram of the P20 core architecture.

DETAILED DESCRIPTION OF THE PREFERRED EMBODIMENTS

The numerous innovative teachings of the present application will be described with particular reference to the presently preferred embodiment (by way of example, and not of limitation).

Order—Independent 3D Graphics Binning Architecture

Figure 1:
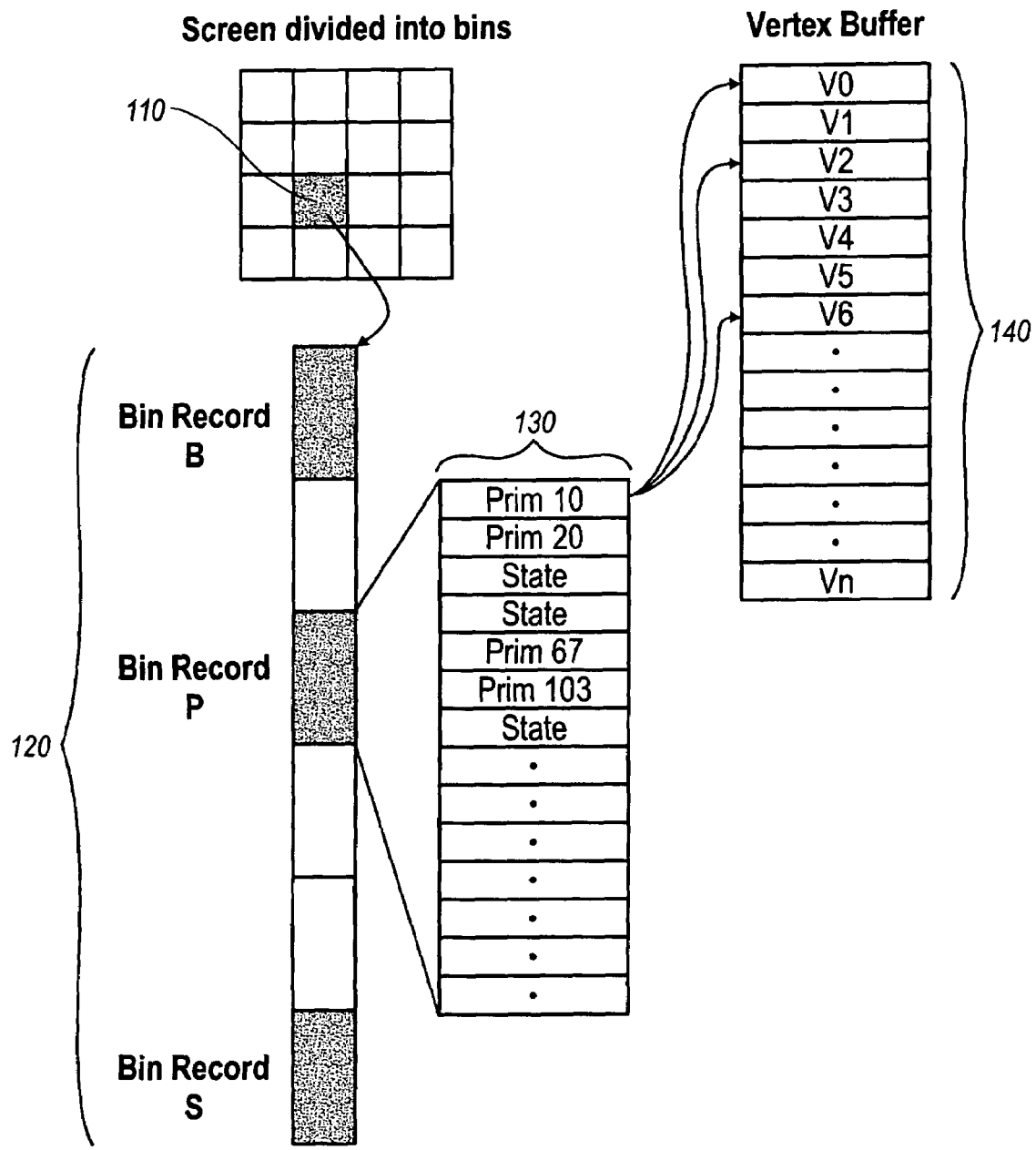
FIG. 1 depicts a screen divided into bins utilizing a conventional binning method.

FIG. 1 depicts a screen divided into bins utilizing a conventional binning method. As shown in this figure, bin 110 holds the information for both transparent and opaque primitives. List 120 shows a sample embodiment of the bin records associated with bin 110. List 130 shows a sample embodiment of the information associated with bin record p. Vertex buffer 140 shows a sample embodiment of a vertex buffer and its correlation to the vertices associated with primitive 10 of bin record p.

Figure 2:
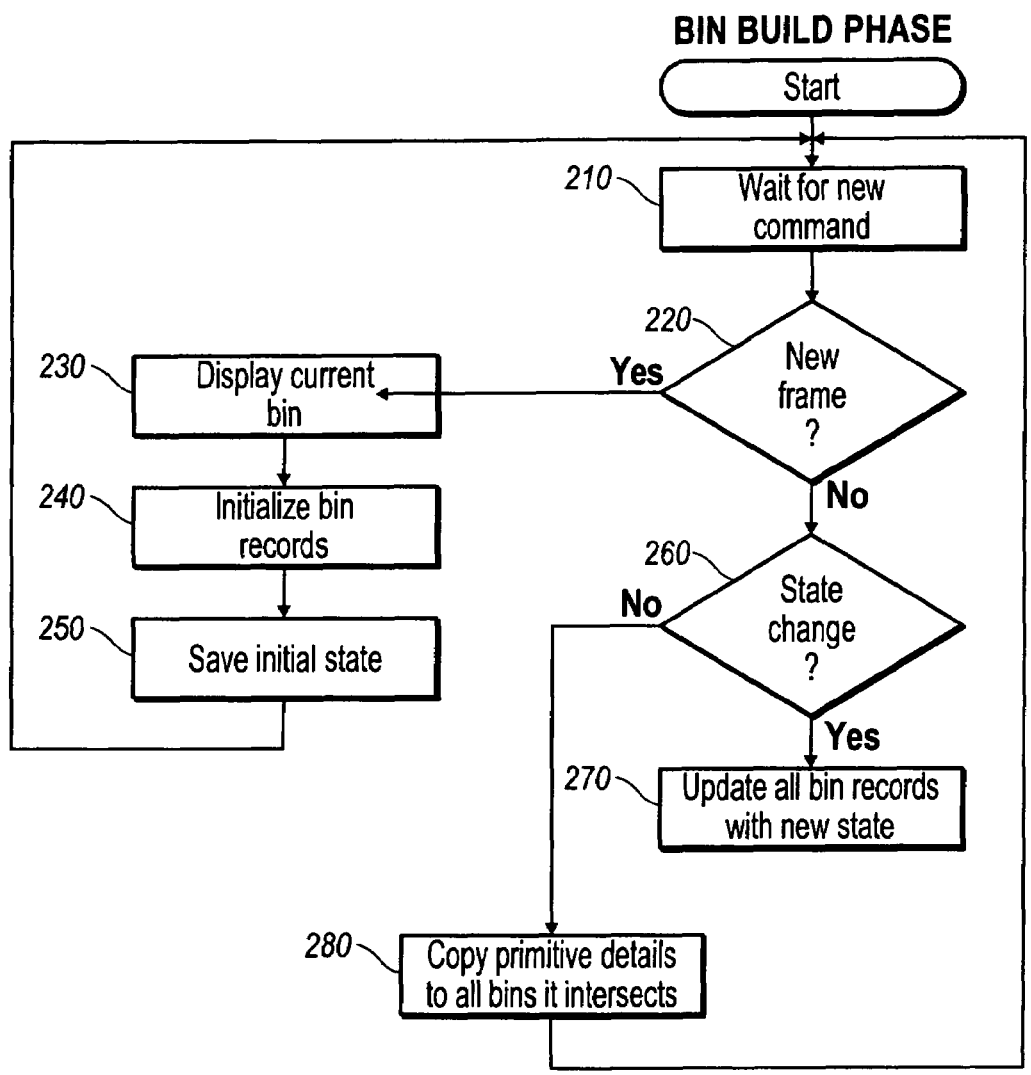
FIG. 2 is a flowchart of the bin build phase of a conventional binning method.

FIG. 2 is a flowchart of the bin build phase of a conventional binning method. This involves waiting for a new command (step 210). Once a new command is received, the system must determine if it is a new frame that is called for (step 220).

If a new frame is called for, then the current bin is displayed (step 230). The bin records are initialized (step 240), and the initial state of the bin is saved (step 250). The system then waits for the next new command (back to step 210).

If a new frame is not called for, the system then determines if a new state change is called for (step 260). If a new state change is called for, then all bin records are updated with the new state (step 270). If a new state change is not called for, then the primitive details are copied to all the bins that it intersects (step 280), and the system waits for the next new command (back to step 210).

Figure 3:
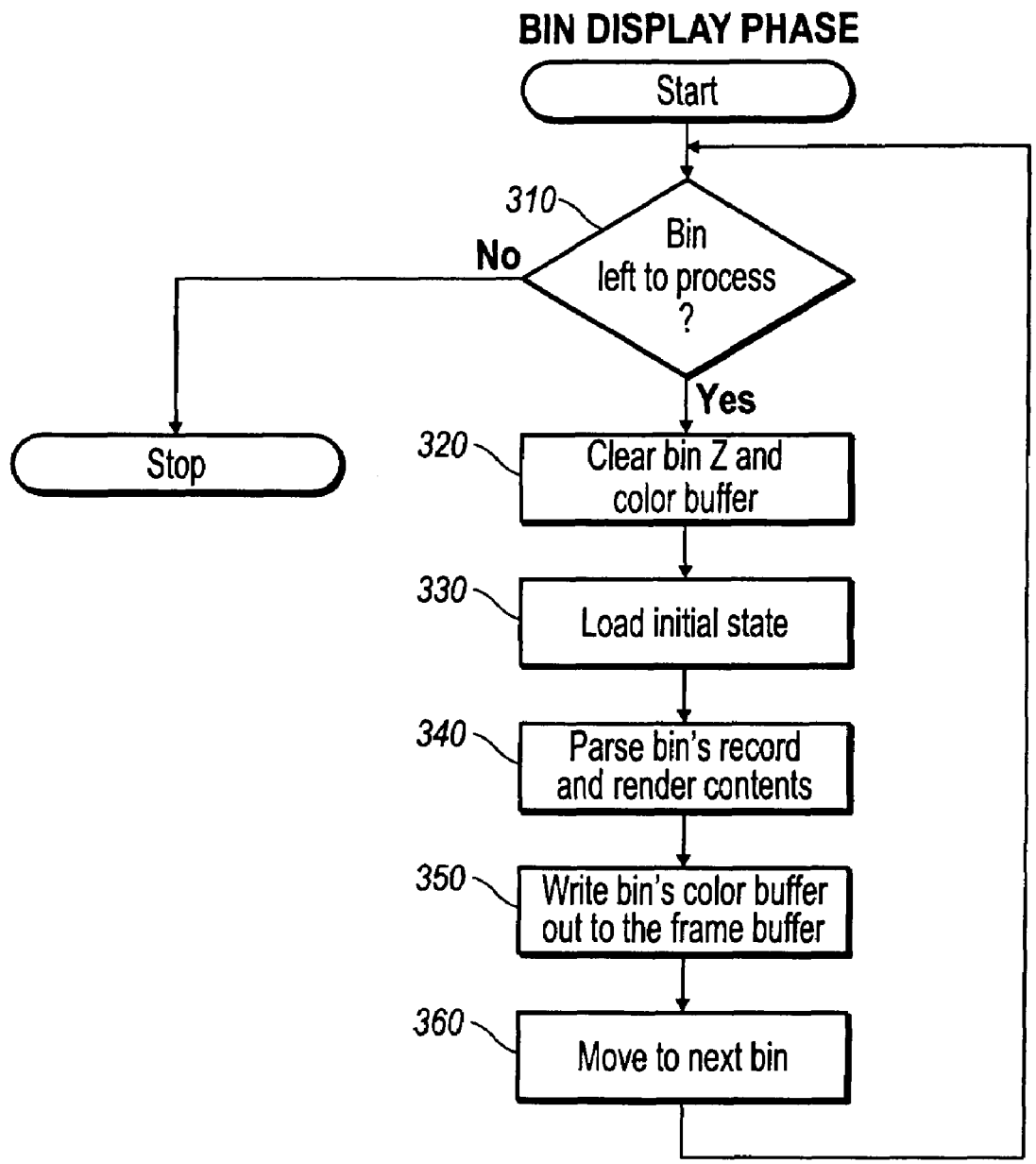
FIG. 3 is a flowchart of the bin display phase of a conventional binning method.

FIG. 3 is a flowchart of the bin display phase of a conventional binning method. The system must determine if there remains a bin to be processed (step 310). If there is not, then no further action is required at this point.

If there remains a bin to be processed, then Bin Z and the Color buffer are cleared (step 320). The initial state is loaded (step 330). The bin's records are parsed, and its contents are rendered (step 340). The bin's color buffer is written out to the frame buffer (step 350), and the system moves to the next bin (step 360).

Figure 4:
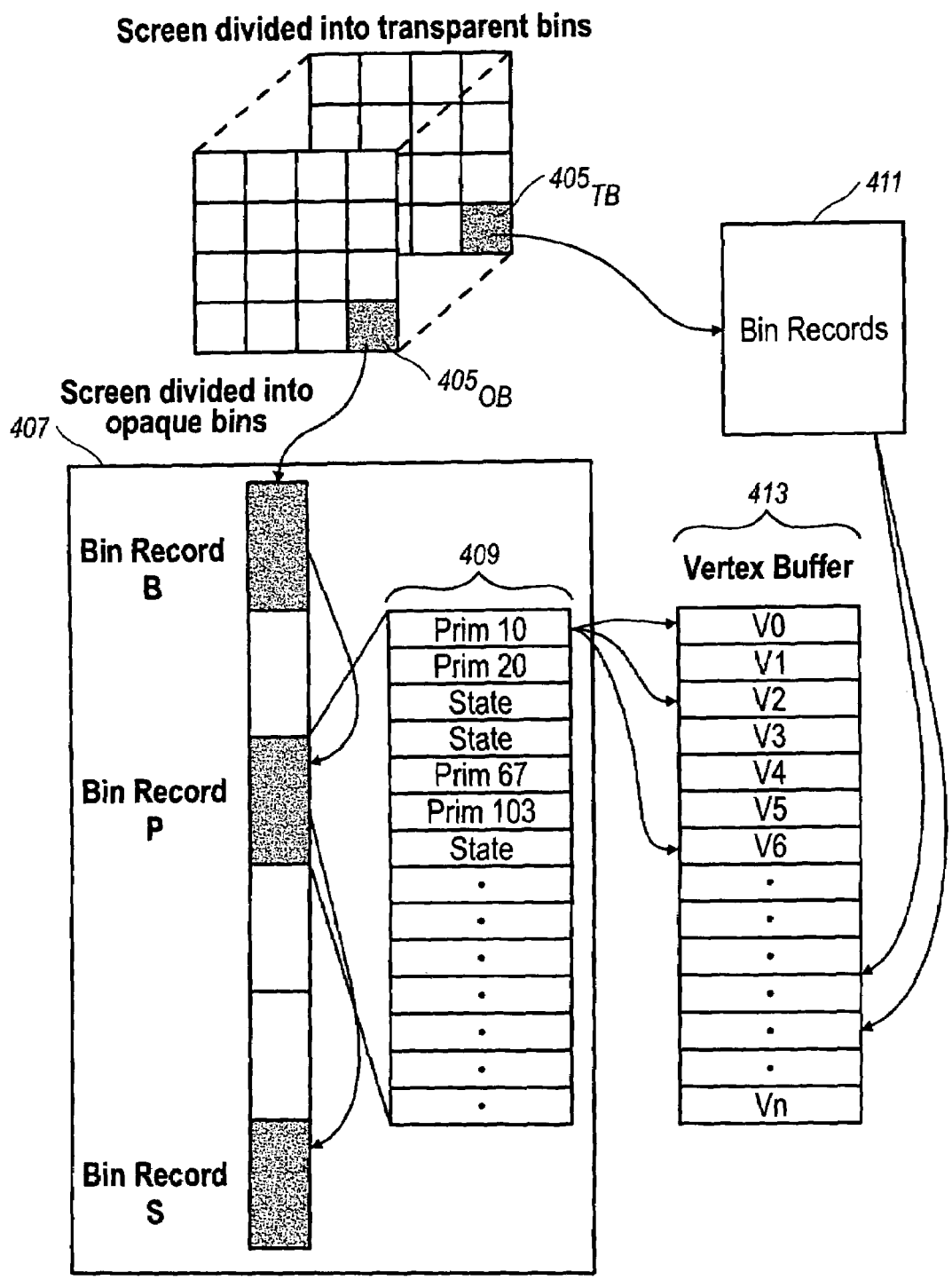
FIG. 4 depicts a single screen divided into transparent and opaque bins utilizing the methods and systems of the present application.

FIG. 4 depicts a single screen divided into transparent and opaque bins utilizing the methods and systems of the present application. Bin $405_{OB}$ is an example of an opaque bin. Bin $405_{TB}$ is an example of a corresponding transparent bin. Linked-list 407 shows a sample embodiment of the bin records associated with bin $405_{OB}$. Bin records 411 represents the bin records linked to bin $405_{TB}$. List 409 shows a sample embodiment of the information associated with bin record p of linked-list 407. Vertex buffer 413 shows a sample embodiment of a vertex buffer and its correlation to the vertices associated with primitive 10 of bin record p, as well as its correlation to the primitives associated with bin records 411.

Figure 5:
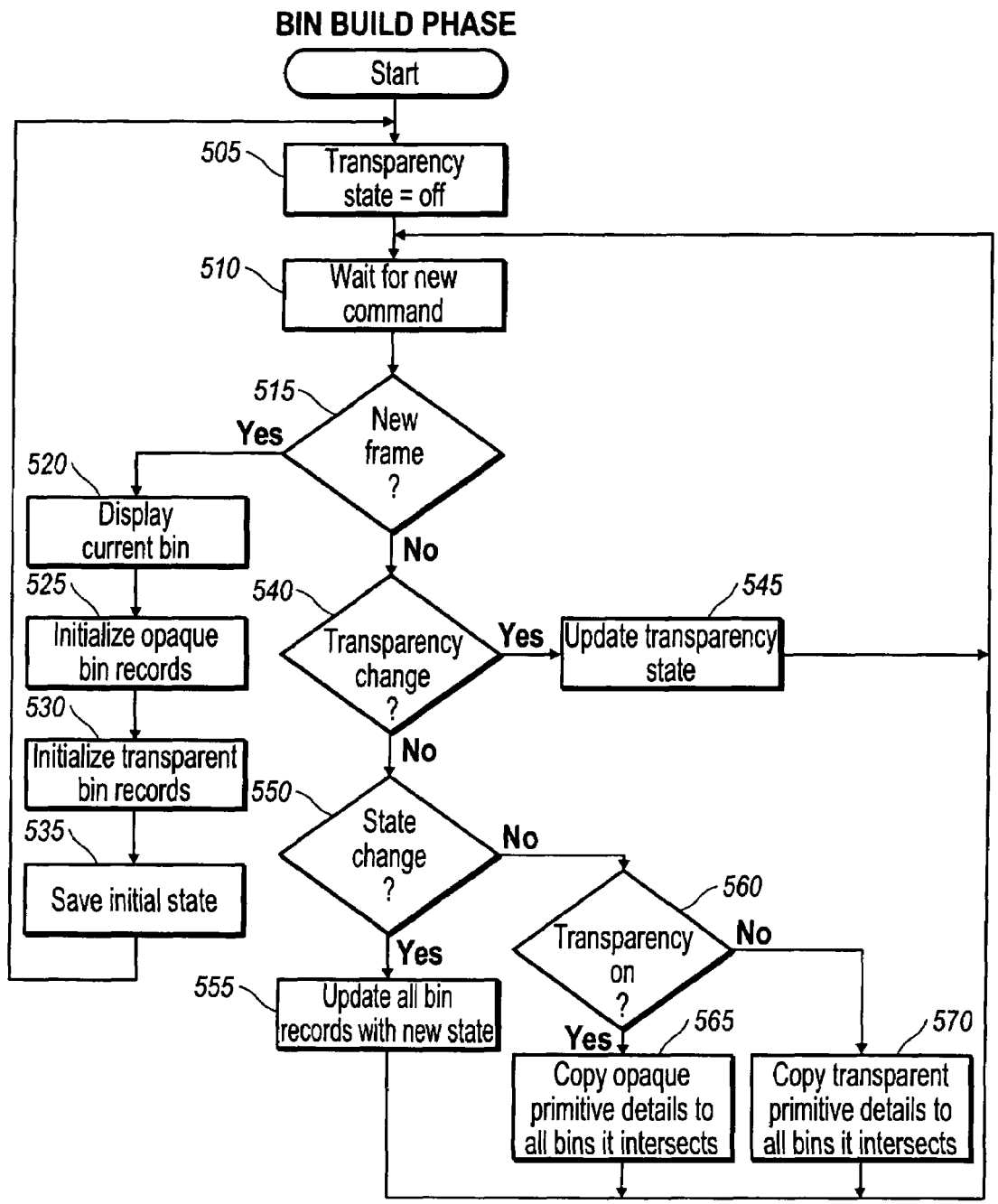
FIG. 5 is a flowchart of the bin build phase of the methods and systems of the present application.

FIG. 5 is a flowchart of the bin build phase of the methods and systems of the present application. The system begins by setting the transparency state to off (step 505). The system then waits for a new command (step 510). Once a new command is received, the system must determine if it is a new frame that is called for (step 515).

If a new frame is called for, then the current bin is displayed (step 520). The opaque bin records are initialized (step 525), and the transparent bin records are initialized (step 530). The initial state of the bin is then saved (step 535). The system then resets the transparency state to off and waits for the next new command (back to step 505).

If a new frame is not called for, the system then determines if the transparency state has changed (step 540). If it has, the transparency state is then updated (step 545), and the system waits for the next new command (back to step 510).

If the transparency state has not changed, then the system determines if a new state change is called for (step 550). If a new state is called for, then all bin records are updated with the new state (step 555), and the system waits for the next new command (back to step 510).

If a new state change is not called for, then the system determines if the transparency is on (step 560). If the transparency is on, then the system copies the primitive details to all the transparent bins that that the primitive intersects (step 565). If the transparency is not on, then the system copies the primitive details to all the opaque bins that that the primitive intersects (step 570). The system waits for the next new command (back to step 210).

Figure 6:
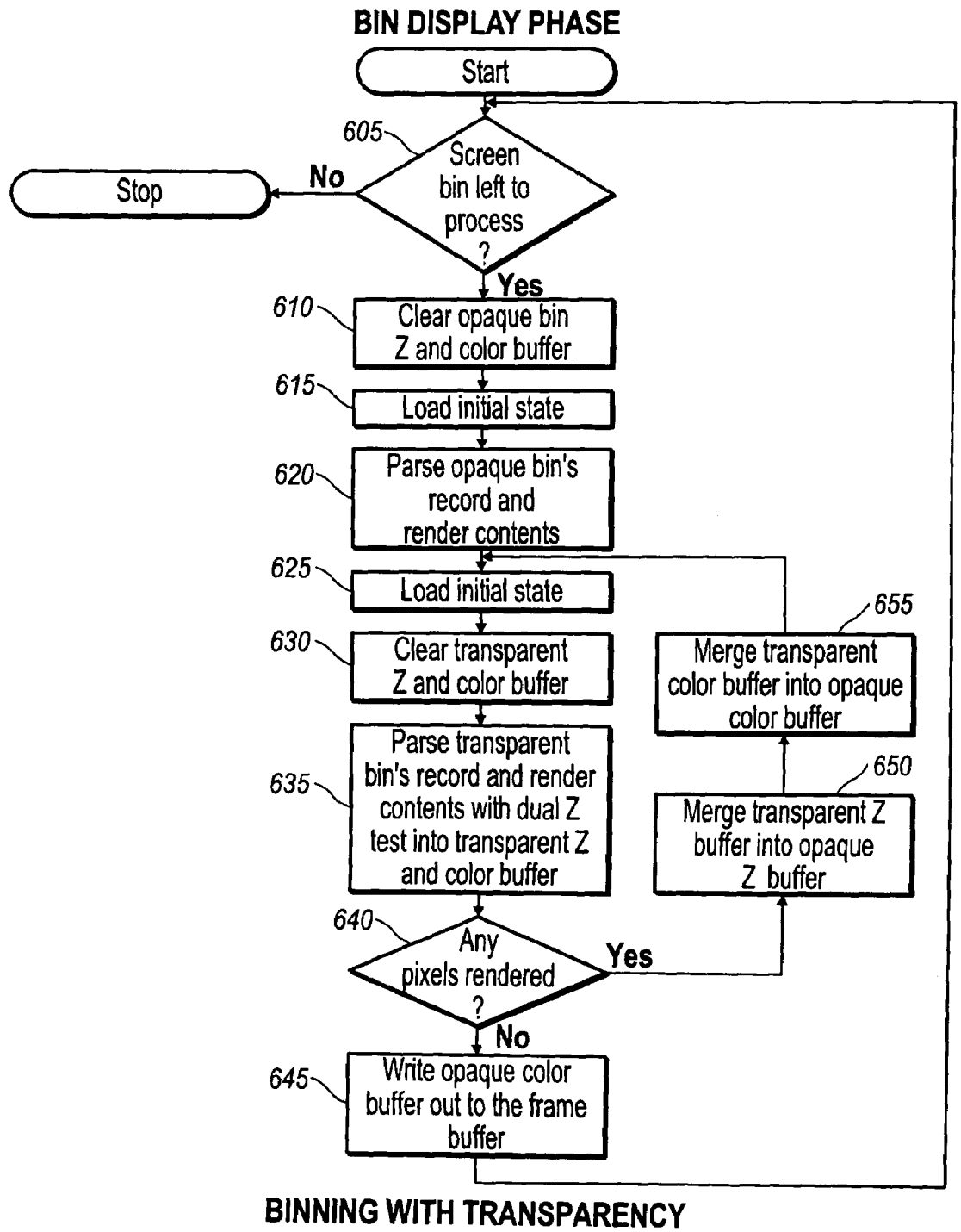
FIG. 6 is a flowchart of the bin display phase of the methods and systems of the present application.

FIG. 6 is a flowchart of the bin display phase of the methods and systems of the present application. The system must determine if there remains a bin to be processed (step 605). If there is not, then no further action is required at this point.

If there remains a bin to be processed, the opaque bin and its color buffer are cleared (step 610). The initial state is loaded (step 615). The opaque bin's records are parsed, and its contents rendered (step 620). The initial state is then loaded (step 625). The transparent Z and color buffers are cleared (step 630). The transparent bin's record is parsed, and its contents rendered with dual Z test into the transparent Z and color buffers (step 635). The system then determines if there are any pixels to be rendered (step 640). If there are no pixels to be rendered, then the system writes the opaque color buffer out to the frame buffer (step 645). If there are pixels to be rendered, then the system merges the transparent Z buffer into the opaque Z buffer (step 650). It then merges the transparent color buffer into the opaque color buffer (step 655) and loads the initial state again (back to step 625).

P20 Architecture

The following description gives details of a sample embodiment of the preferred rendering accelerator chip (referred to as "P20" in the following document, although not all details may apply to every chip revision marketed as P20). The following description gives an overview of the P20 Core Architecture and largely ignores other important parts of P20 such as GPIO and the Memory subsystem.

P20 is an evolutionary step from P10 and extends many of the ideas embodied in P10 to accommodate higher performance and extensions in APIs, particularly OpenGL 2 and DX9.

The main functional enhancements over P10 are the inclusion of a binning subsystem and a fragment shader targeted specifically at high level language support.

The P20 architecture is a hybrid design employing fixed-function units where the operations are very well defined and programmable units where flexibility is needed. No attempt has been made to make it backwards compatible, and a major rewrite of the driver software is expected. (The architecture will be less friendly towards software—changes in the API state will no longer be accomplished by setting one or more mode bits in registers, but will need a new program to be generated and downloaded when state changes. More work is pushed onto software to do infrequent operations such as aligning stipple or dither patterns when a window moves.)

General Performance Goals

The general raw performance goals are:

64 fragment/cycle WID/scissor/area stipple processing;
64 fragments/cycle Z failure (visibility testing);
16 fragments/cycle fill rate at 32 bpp (depth buffered with flat or Gouraud shading);
6 fragments/cycle for single texture (trilinear) operations;
3 cycle single pixel Gouraud shaded depth buffered triangle rate;
4-sample multi sample operation basically for free; and
400 MHz operational frequency (This frequency assumes a 0.13 micron process. A 200 MHz design speed at 0.18 micron scales by 25% going to a 0.15 micron process, and this scales again by 25% going to 0.13 according to TSMC.).

The architecture has been designed to allow a range of performance trade-offs to be made, and the first-instantiated version will lie somewhere in the middle of the performance landscape.

Isochronous Operation

Isochronous operation is where some type of rendering is scheduled to occur at a specific time (such as during frame blanking) and has to be done then irrespective of what ever other rendering may be in progress. GDI+/Longhorn is introducing this notion to the Windows platform. The two solutions to this problem are to have an independent unit to do this so the main graphics core does not see these isochronous commands or to allow the graphics core to respond to pre-emptive multitasking.

The first solution sounds the simplest and easiest to implement, and probably is, if the isochronous stream were limited to simple bits; however, the functionality does not have to grow very much (fonts, lines, stretch blits, color conversion, cubic filtering, video processing, etc.) before this side unit starts to look more and more like a full graphics core.

The second solution is future proof and may well be more gate-efficient as it reuses resources already needed for other things. However, it requires an efficient way to context switch, preferably without any host intervention, and a way to suspend the rasterizer in the middle of a primitive.

Fast context switching can be achieved by duplicating registers and using a bit per Tile message to indicate which context should be used or a command to switch sets. This is the fastest method but duplicating all the registers (and WCS) will be very expensive and sub setting them may not be very future proof if a register is missed out that turns out to be needed.

As any context-switchable state flows through into the rasterizer, part of the pipeline that it goes through is the Context Unit. This unit caches all context data and maintains a copy in the local memory. A small cache is needed so that frequently updating values such as mode registers do not cause a significant amount of memory traffic. When a context switch is needed, the cache is flushed, and the new context record read from memory and converted into a message stream to update downstream units. The message tags will be allocated to allow simple decode and mapping into the context record for both narrow and wide-message formats. Some special cases on capturing the context, as well as restoring it, will be needed to look after the cases where keyhole loading is used, for example during program loading.

Context switching the rasterizer part way through a primitive is avoided by having a second rasterizer dedicated to the isochronous stream. This second rasterizer is limited to just rectangles as this fulfils all the anticipated uses of the isochronous stream. (If the isochronous stream wants to draw lines, for example, then the host software can always decompose them into tiles and send the tile messages just as if the rasterizer had generated them.)

There are some special cases where intermediate values (such as the plane equations) will need to be regenerated, and extra messages will be sent following a context switch to force these to occur. Internal state that is incremented, such as glyph position and line stipple position, needs to be handled separately.

T&L context is saved by the Bin Manager Unit and restored via the GPIO Context Restore Unit. The Bin Manager, Bin Display, Primitive Setup and Rasterizer units are saved by the Context Unit and restored via the GPIO Context Restore Unit.

Memory Bandwidth

Memory bandwidth is a crucial design factor, and every effort has been made to use the bandwidth effectively; however, there is no substitute for having sufficient bandwidth in the first place. A simple calculation shows that 32 bits per pixel, Z-buffered, alpha-blended rendering takes 16 bytes per fragment so a 16 fragment-per-cycle architecture running at 400 MHz needs a memory bandwidth of 102 GB/s. Add in memory inefficiencies (page breaks, refresh) and video refresh (fairly insignificant in comparison to the rendering bandwidth), and this probably gets up at 107 GB/s or so. (With an 8-filter pipe system, turning on textures will decrease this figure to approximately 51 GB/s because the number of fragments per cycle will halve. Textures can be stored compressed so a 32-bit texture will take one byte of storage so the increase in bandwidth due to texture fetches will be reduced (5 bytes were assumed in the calculations –4 bytes from the high resolution texture map per fragment and 4 bytes per four fragments for the low resolution map)).

The memory options are as follows:

DDR2 SDRAM running at 500 MHz has a peak bandwidth of 16 GB/s when the memory is 128-bits wide, or 32 GB/s when 256-bits wide. There are no real impediments to using this type of memory, but increasing the width beyond 256 bits is not feasible due to pin count and cost.

Embedded DRAM or 1T RAM. eRAM is the only technology that can provide these very high bandwidth rates by enabling very wide memory configurations. eRAM comes with a number of serious disadvantages: There is a high premium on the cost of the chips as they require more manufacturing steps (for eDRAM); they are foundry-specific, and with some foundries, the logic speed suffers. Only a modest amount of eRAM (say 8 MBytes) can fit onto a chip economically. This is far short of what is needed, particularly with higher-resolution and deep-pixel displays. eRAM really needs to be used as a cache (so it is back to relying on high locality of reference and reuse of pixel data to give a high apparent bandwidth to an economical, external memory system).

Change the rules. If the screen were small enough to fit into an on-chip cache (made from eRAM or more traditional RAM), then most of this rendering bandwidth will be absorbed internally. Clearly, the screen cannot be made small enough or the internal caches big enough, but by sorting the incoming geometry and state into small cache-sized, screen-aligned regions (called bins, buckets, chunks and, confusingly, tiles in the literature) and rendering each bin in turn allow this to be achieved. This is accomplished by spending the memory bandwidth in a different way (writing and reading the bin database) so provided that the database bandwidth is less than the rendering bandwidth and can be accommodated by the external memory bandwidth, the goal has been effectively achieved.

P20 uses an (optional) binning style architecture together with state of the art DDR2 memory to get the desired performance. Binning also offers some other interesting opportunities that will be described later.

Binning

Binning works by building a spatially-sorted scene description before rendering to allow the rendering of each region (or bin) to be constrained to fit in the caches. The building of the bin database for one frame occurs while the previous frame is rendered. (Frame means more than just the displayed frame. Intermediate 'frames', such as generated by render-to-texture operations, also are included in this definition. Any number of frames may be held in the bin data structures for subsequent rendering; however, it is normal to buffer only one final display frame to reserve interactivity and reduce the transport delay in an application or game.)

Binning has the following benefits:

Reduces the rendering bandwidth by keeping all the depth and color data on-chip except for the final write to memory once a bin has been processed. For aliased rendering, the frame buffer bandwidth is, therefore, a constant one-pixel write per frame irrespective of overdraw or the amount of alpha-blending or depth read-modify-write operations. Also, note that in many cases, there is no need to save the depth buffer to memory, thereby halving the bandwidth. For FSAA, this is even more dramatic as approximately 4× more reads and writes occur while rendering (assuming 4-sample FSAA). The down-sampling also is done from on-chip memory so the bandwidth demand remains the same as in the non-FSAA case. Some of these bandwidth savings are lost due to the bandwidth needed to build and parse the bin data structures, and this will be exacerbated with FSAA as the caches will cover a smaller area of screen (the database will be traversed more times). The over all bandwidth saving is scene and triangle-size dependent.

Fragment computations or texturing is saved by using deferred rendering. A bin is traversed twice—on the first (but simpler pass), the visibility buffer is set up, and no color calculations are done. On the second pass, only those fragments determined to be visible are rendered—effectively reducing the opaque depth complexity to 1. As most games have an average depth complexity >3, this can give up to a 3× or more boost to the apparent fill rate (depending on the original primitive submission order).

Less FSAA work. During the first pass of the deferred rendering operation, the location of edges (geometric and inferred due to penetrating faces) can be ascertained, and only those sub-tiles holding edges need to have the multi-sample depth values calculated and the color replicated to the covered sample points. This saves cycles to update the multi-sample buffers and any program cost for alpha-blending.

Order Independent Transparency. Each bin region has a pair of bin buffers—one holds the opaque primitives and the other holds the transparent primitives. After the opaque bin is rendered, the transparent bin is rendered multiple times until all the transparency layers have been resolved. The layers are resolved in a back to front order, and successive layers touch fewer and fewer fragments.

Stochastic super sampling FSAA. The contents of a bin are rendered multiple times with the post-transformed primitives being jittered per pass. This is similar to accumulation buffering at the application level but occurs without any application involvement (motion blur and depth of field effects cannot be done). It has superior quality and smaller memory footprint than multi-sample FSAA; however, it is slower as the color is computed at each sample point (unlike multi-sample where one color per fragment is calculated).

The T&L and rasterisation work proceed in parallel with no fine grain dependencies so a bottle neck in one part will not stall the other. This will still happen at frame granularity, but within a frame, the work flow will be much smoother.

Memory footprint can be reduced when the depth buffer does not need to be saved to memory. With FSAA, the depth and color sample buffers are rarely needed after the filtered color has been determined. Note that as all the memory is virtual, space can be allocated for these buffers (in case of a premature flush), but the demand will only be made on the working set if a flush occurs. Note that the semantics of OpenGL can make this hard to use.

The bin database holds the post-transformed primitive data and state. Only primitives that have passed clipping and culling will be added to the database, and great care is taken to ensure this data is held in a compact format with a low build and traversal cost.

However, if there is not enough memory to hold the bin data structures, then two portions of the memory are allocated: one for state and primitive information and the other for vertex data. Both regions can be 256 MB in size. It is unlikely, therefore, that the bins will need to be prematurely flushed before all the data has been seen. Reserving such large amounts of memory, however, may be problematic in some systems. This memory is virtual memory. Therefore, in these extreme scenes, performance will gradually degrade (as pages are swapped out of on-card memory), but all the algorithms and optimizations will continue. Nevertheless, the problem of running out of memory on the ultra-extreme scenes, or maybe because less generous state/primitive and vertex buffers have been allocated, must be addressed.

When the buffers overflow, the scene is effectively rendered in several 'passes', and the memory footprint savings is lost, but most of the bandwidth savings still remain. For each pass, the results of the previous pass need to be loaded, and the results of the current pass saved. The rendering bandwidth requirement for the depth and color buffers is, therefore, #pixels*((#passes*2)−1)*bytes per pixel for depth and color. Therefore, provided each pass holds a reasonable amount of geometry, there is still large savings. Clearly, depth complexity plays an important role in this, but on complex scenes that will overflow the bin data structure buffers, there will usually be high-depth complexity.

When there is premature flushing, the order-independent binning and stochastic super-sampling algorithms break as they rely on having all the scene present before they start. A premature flush also will disable edge tracking so the correct image will be generated, albeit at a lower performance.

A block diagram for the core of P20 is shown in FIG. 1A. Some general observations:

General control, register loading, and synchronising internal operations are all done via the message stream.

The message stream, for the most part, does not carry any vertex parameter data (other than the coordinate data).

The message stream does not carry any pixel data except for upload/download data and fragment coverage data. The private data paths give more bandwidth and can be tailored to the specific needs of the sending and receiving units.

The Fragment Subsystem can be thought of as working in parallel but is, in fact, physically connected as a daisy chain to make the physical layout easier.

GPIO

There are two independent command streams—one servicing the GP stream (for 3D and general 2D commands), and one servicing the Isochronous stream. The isochronous command unit has less functionality as it does not need, for example, to support vertex arrays. GPIO performs the following distinct operations:

Input DMA

The command stream is fetched from memory (host or local as determined by the page tables) and broken into messages based on the tag format. The message data is padded out to 128 bits, if necessary, with zeros, except for the last 32 bits which are set to floating point 1.0. (This allows the short hand formats for vertex parameters to be handled automatically.) The DMA requests can be queued up in a command FIFO or can be embedded into the DMA buffer itself, thereby allowing hierarchical DMA (to two levels). The hierarchical DMA is useful to pre-assemble common command or message sequences.

Circular Buffers

The circular buffers provide a mechanism whereby P20 can be given work in very small packets without incurring the cost of an escape call to the operating system. These escape calls are relatively expensive so work is normally packaged up into large amounts before being given to the graphics system. This can result in the graphics system being idle until enough work has accumulated in a DMA buffer, but not enough to cause it to be dispatched to the obvious detriment of performance. The circular buffers are preferably stored in local memory and mapped into the ICD, and chip resident write pointer registers are updated when work has been added to the circular buffers (this does not require any operating system intervention). When a circular buffer goes empty, the hardware will automatically search the pool of circular buffers for more work and instigate a context switch if necessary.

There are 16 circular buffers, and the command stream is processed in an identical way to input DMA, including the ability to 'call' DMA buffers.

Vertex Arrays

Vertex arrays are a more compact way of holding vertex data and allow a lot of flexibility on how the data is laid out in memory. Each element in the array can hold up to 16 parameters, and each parameter can be from one to four floats in size. The parameters can be held consecutively in memory or held in their own arrays. The vertex elements can be accessed sequentially or via one or two-index arrays.

Vertex Cache Control for Indexed Arrays

When vertex array elements are accessed via index arrays and the arrays hold lists of primitives (lines, triangles or quads, independent or strips), then frequently the vertices are meshed in some way that can be discovered by comparing the indices for the current primitive against a recent history of indices. If a match is found, then the vertex does not need to be fetched from memory (or indeed processed again in the Vertex Shading Unit), thus saving the memory bandwidth and processing costs. The 16 most recent indices are held.

Output DMA

The output DMA is mainly used to load data from the core into host memory. Typical uses of this are for image upload and returning current vertex state. The output DMA is initiated via messages that pass through the core and arrive via the Host Out Unit. This allows any number of output DMA requests to be queued.

Shadow Cache

The shadow cache will keep a copy of the input command stream in memory so it can be reused without an explicit copy. This helps caching of models in on-card memory behind the application's back, particularly when parts of the model are liable to change.

Format Conversion

The Pack and UnPack units provide programmable support for format conversion during download and upload of pixel data.

T&L Subsystem

Figure 1B:
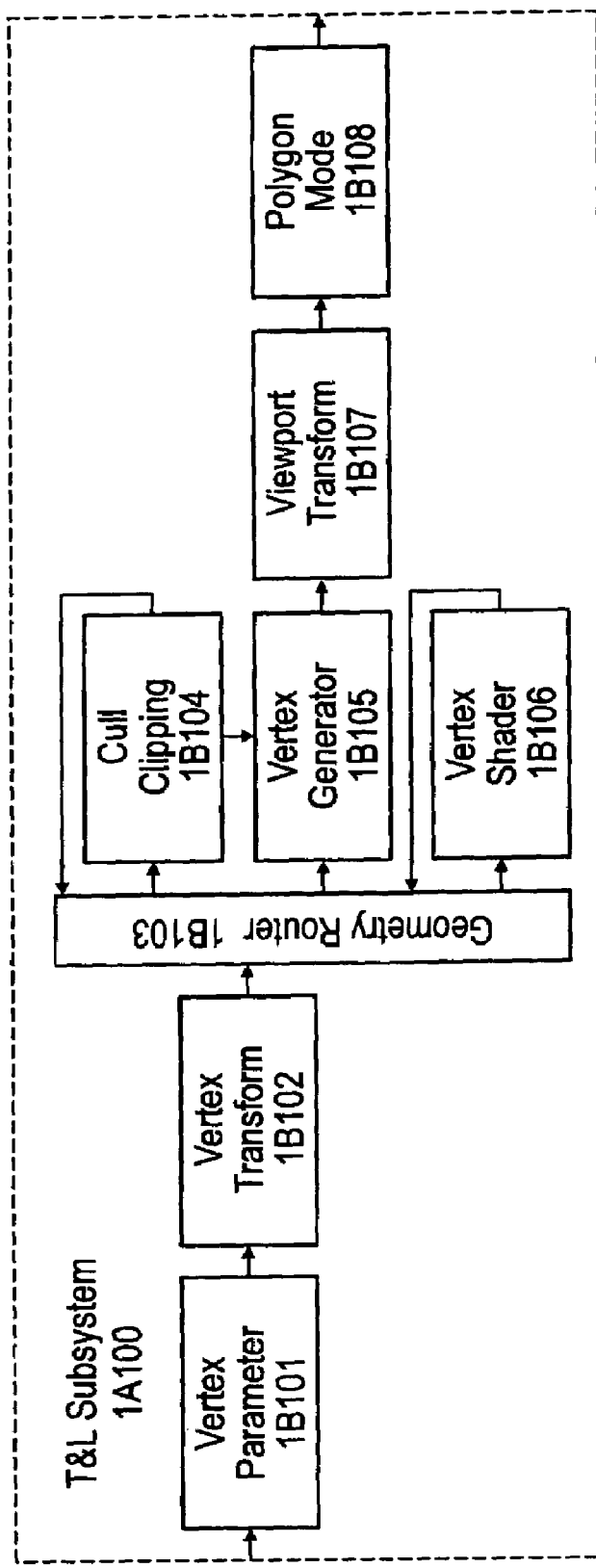
FIG. 1B is a block diagram of T&L Subsystem 1A100.

Transform and Lighting Subsystem 1A100 is shown in FIG. 1B

The main thing to note is that the clipping and culling can be done before or after the vertex shading operation depending on Geometry Router Unit 1B103 setting. Doing the clipping and culling prior to an expensive shading operation can, in some cases, avoid doing work that would be later discarded. A side effect of the cull operation is that the face direction is ascertained so only the correct side in two-sided lighting needs be evaluated. (This is handled automatically and is hidden from the programmer. Silhouette vertices (i.e. those that belong to front and back facing triangles) are processed twice.)

Vertex Parameter Unit 1B101's main tasks are to track current parameter values (for context switching and Get operations), remap input parameters to the slots a vertex shader has been compiled to expect them in, assist with color material processing, and parameter format conversion to normalized floating point values.

Vertex Transformation Unit 1B102 transforms the incoming vertex position using a 4×4 transformation matrix. This is done as a stand alone operation outside of Vertex Shading Unit 1B106 to allow clipping and culling to be done prior to vertex shading.

The Geometry Router Unit 1B103 reorders the pipeline into one of two orders: Transform→Clipping→Shading→Vertex Generator or Transform→Shading→Clipping→Vertex Generator so that expensive shading operations can be avoided on vertices that are not part of visible primitives.

Cull Clipping Unit 1B104 calculates the sign of the area of a primitive and culls it (if so enabled). The primitive is tested against the view frustum and (optionally) user-clipping planes and discarded if it is found to be out of view. In view, primitives pass unchanged. The partially in-view primitives are (optionally) guard band-clipped before being submitted for full clipping. The results of the clipping process are the barycentric coordinates for the intermediate vertices.

Vertex Shading Unit 1B106 is where the lighting and texture coordinate generation are done using a user-defined program. The programs can be 1024 instructions long, and conditionals, subroutines, and loops are supported. The matrices, lighting parameters, etc. are held in a 512 Vec4 Coefficient memory. Intermediate results are stored either in a 64-deep vec2 memory or an 8-deep scalar memory, providing a total of 136 registers. These registers are typeless but are typically used to store 36-bit floats. The vertex input consists of 24 Vec4s and are typeless. (One parameter is identified as the trigger parameter, and this is the last parameter for a vertex.) The vertex results are output as a coordinate and up to 16 Vec4 parameter results. The parameters are typeless, and their interpretation depends on the program loaded into Fragment Shading Unit 1F171.

Vertices are entered into the double-buffered input registers in round robin fashion. When 16 input vertices have been received or an attempt is made to update the program or coefficient memories, the program is run. Non-unit messages do not usually cause the program to run, but they are correctly interleaved with the vertex results on output to maintain temporal ordering.

Vertex Shading Unit 1B106 is implemented as a 16-element SIMD array, with each element (VP) working on a separate vertex. Each VP consists of two FP multipliers, an FP adder, a transcendental unit, and an ALU. The floating point operations are done using 36-bit numbers (similar to IEEE but with an extra 4 mantissa bits). Dual mathematical instructions can be issued so multiple paths exist between the arithmetic elements, the input storage elements, and the output storage elements.

Vertex Generator Unit 1B105 holds a 16-entry vertex cache and implements the vertex machinery to associate the stream of processed vertices with the primitive type. When enough vertices for the given primitive type have been received, a GeomPoint, GeomLine, or GeomTriangle message is issued. Clipped primitives have their intermediate vertices calculated here using the barycentric coordinates from clipping and the post-shading parameter data. Flat shading, line stipple, and cylindrical texture wrapping are also controlled here.

Viewport Transform Unit 1B107 perspectively divides the (selected) vertex parameters, and viewport maps the coordinate data.

Polygon Mode Unit 1B108 decomposes the input triangle or quad primitives into points and/or lines as needed to satisfy OpenGL's polymode processing requirements.

The context data for the T&L subsystem is stored in the context record by Bin Manager Unit 1A113.

Binning Subsystem

Binning Subsystem 1A110 is largely passive when binning is not enabled, and the messages just flow through; however, it does convert the coordinates to be screen relative. Stippled lines are decomposed, and vertex parameters are still intercepted and forwarded to the PF Cache 1C118 to reduce message traffic through the rest of the system. The following description assumes binning is enabled.

Figure 1C:
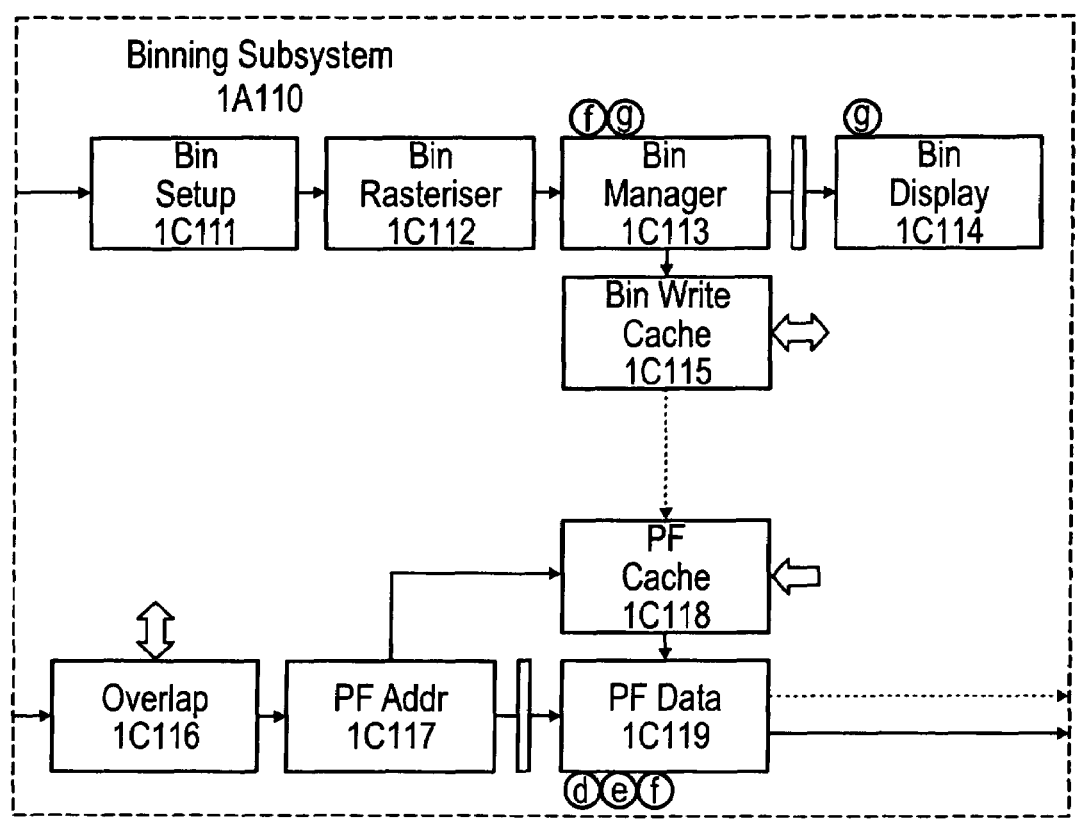
FIG. 1C is a block diagram of Binning Subsystem 1A110.

Binning Subsystem 1A110 is shown in the FIG. 1C. Bin Setup Unit 1C111 takes the primitive descriptions (the Render* messages) together with the vertex positions and prepares the primitive for rasterization. For triangles, this is simple as the triangle vertices are given, but for lines and points, the vertices of the rectangle or square to be rasterized must be computed from the input vertices and size information. Stippled lines are decomposed into their individual segments as these are binned separately. Binning and rasterization occur in screen space so the input window-relative coordinates are converted to screen space coordinates here.

Bin Rasterizer Unit 1C112 takes the primitive description prepared by the Bin Setup Unit and calculates the bins that a primitive touches. A bin can be viewed as a 'fat' pixel as far as rasterization is concerned as it is some multiple of 32 pixels in width and height. The rasterizer uses edge functions and does an inside test for each corner of the candidate bin to determine if the primitive touches it. The primitive and the group of bins that it touches are passed to Bin Manager Unit 1C113 for processing. The bin seeking accurately tracks the edges of the primitive for aliased rendering; however, antialiased rendering can sometimes include bins not actually touched by the primitive (this is a slight inefficiency but doesn't cause any problems downstream).

Bin Manager Unit 1C113 maintains a spatial database in memory that describes the current frame being built while Bin Display Unit 1C114 is rendering the previous frame. All writes to memory go via Bin Write Cache 1C115. The database is divided between a Vertex Buffer and a Bin Record Buffer. The vertex buffer holds the vertex data (coordinate and parameters), and these are appended to the buffer whenever they arrive. The buffer works in a pseudo circular buffer fashion and is used collectively by all the bins. The Bin Record Buffer is a linked list of bin records with one linked list per bin region on the screen (up to 256) and holds state data as well as primitive data. A linked list is used because the number of primitives per bin region on the screen can vary wildly. When state data is received, it is stored locally until a primitive arrives. When a primitive arrives, the bin(s) is checked to see if any state has changed since the last primitive was written to the bin, and the bin updated with the changed state. Compressed pointers to the vertices used by a primitive are calculated and, together with the primitive details, are appended to the linked list for this bin.

Bin Manager Unit 1C113 only writes to memory, and Bin Write Cache 1A115 handles the traditional cache functions to minimize memory bandwidth and read/modify/write operations as many of the writes will only update partial memory words.

Bin Manager Unit 1C113 also can be used as a conduit for vertex data to be written directly to memory to allow the results of one vertex shader to be fed back into a second vertex shader and can be used, for example, for surface tessellation. The same mechanism can also be used to load memory with texture objects and programs.

Bin Display Unit 1C114 will traverse the bin record linked list for each bin and parse the records, thereby recreating the temporal stream of commands this region of the screen would have seen had there been no binning. Prior to doing the parsing, the initial state for the bin is sent downstream to ensure all units start in the correct state.

Parsing of state data is simple—it is just packaged correctly and forwarded. Parsing primitives is more difficult as the vertex data needs to be recovered from the compressed vertex pointers and sent on before the primitive itself. Only the coordinate data is extracted at this point—the parameter data is handled later, after primitive visibility has been determined. A bin may be parsed several times to support deferred rendering, stochastic super sampling, and order-independent transparency. Clears and multi-sampling filter operations can also be done automatically per bin.

The second half of the binning subsystem is later in the pipeline, but is described now.

Overlap Unit 1C116 is basically a soft FIFO (i.e. if the internal hardware FIFO becomes full, it will overflow to memory) and provides buffering between Visibility Subsystem 1A160 and Fragment Subsystem 1A170 to allow the visibility testing to run on ahead and not get stalled by fragment processing. This is particularly useful when deferred rendering is used as the first pass produces no fragment processing work so could be hidden under the second pass of the previous bin. Tiles are run-length encoded to keep the memory bandwidth down.

The Parameter Fetch (PF) Units will fetch the binned parameter data for a primitive if, and only if, the primitive has passed visibility testing (i.e. at least one tile from the primitive is received in the PF Subsystem). This is particularly useful with deferred rendering where in the first pass everything is consumed by the Visibility Subsystem. The PF Units are also involved in loading texture object data (i.e. the state to control texture operations for one of the 32 potentially active texture maps) and can be used to load programs from memory into Pixel Subsystem 1A190 (to avoid having to treat them as tracked state while binning).

PF Address Unit 1C117 calculates the address in memory where the parameters for the vertices used by a primitive are stored and makes a request to PF Cache 1C118 for that parameter data to be fetched. The parameter data will be passed directly to PF Data Unit 1C119. It also will calculate the addresses for texture objects and pixel programs.

PF Data Unit 1C119 will convert the parameter data for the vertices into plane equations and forward these to Fragment Subsystem 1A170 (over their own private connection). For 2D rendering, planes can also be set up directly without having to supply vertex data. The texture object data and pixel programs also are forwarded on the message stream.

Rasterizer Subsystem

The Rasterizer subsystem consists of a Primitive Setup Unit, a Rasterizer Unit and a Rectangle Rasterizer Unit.

Rectangle Rasterizer Unit 1A120, as the name suggests, will only rasterize rectangles and is located in the isochronous stream. The rasterization direction can be specified.

Primitive Setup Unit 1A130 takes the primitive descriptions (the Render* messages) together with the vertex positions and prepares the primitive for rasterization. This includes calculating the area of triangles, splitting stippled lines (aliased and antialiased) into individual line segments (some of this work has already been done in Bin Setup Unit 1C111), converting lines into quads for rasterization, converting points into screen-aligned squares for rasterization and AA points to polygons. Finally, it calculates the projected x and y gradients from the floating point coordinates to be used elsewhere in the pipeline for calculating parameter and depth gradients for all primitives.

The xy coordinate input to Rasterizer Unit 1A140 is 2's complement 15.10 fixed point numbers. When a Draw* command is received, the unit will then calculate the 3 or 4 edge functions for the primitive type, identify which edges are inclusive edges (i.e. should return inside if a sample point lies exactly on the edge; this needs to vary depending on which is the top or right edge so that butting triangles do not write to a pixel twice) and identify the start tile.

Once the edges of the primitive and a start tile are known, the rasterizer seeks out screen-aligned super tiles (32×32 pixels) which are inside the edges or intersect the edges of the primitive. (In a dual P20 system, only those super tiles owned by a rasterizer are visited.) Super tiles that pass this stage are further divided into 8×8 tiles for finer testing. Tiles that pass this second stage will be either totally inside or partially inside the primitive. Partial tiles are further tested to determine which pixels in the tile are inside the primitive, and a tile mask is built up. When antialiasing is enabled, the partial tiles are tested against the user-defined sample points to build up the coverage (mask or value) for each pixel in the tile.

The output of the rasterizer is the Tile message which controls the rest of the core. Each Tile message holds the tile's coordinate and tile mask (among other things). The tiles are always screen-relative and are aligned to tile (8×8 pixel) boundaries. Before a Tile message is sent, it is optionally scissored and masked using the area stipple pattern. The rasterizer will generate tiles in an order that maximizes memory bandwidth by staying in page as much as is possible. Memory is organized in 8×8 tiles, and these are stored linearly in memory. (A 16×4 layout in memory is also supported as this is more suitable for video display, but this is largely hidden from most of the core units (some of the address and cache units need to take it into account)).

The rasterizer has an input coordinate range of ±16K, but after visible rectangle clipping, this is reduced to 0 . . . 8K. This can be communicated to the other units in 10-bit fields for x and y as the bottom 3 bits can be omitted (they are always 0). Destination tiles are always aligned as indicated above, but source tiles can have any alignment (they are read as textures).

Context Unit

The isochronous stream and the main stream join into a common stream at Context Unit 1A145. Context Unit 1A145 will arbitrate between both input streams and dynamically switch between them. This switching to the isochronous stream normally occurs when the display reaches a user-defined range of scanlines. Before the other stream can take over, the context of the current stream must be saved, and the context for the new stream restored. This is done automatically by Context Unit 1A145 without any host involvement and takes less than 3 μS.

As state or programs for the downstream units pass through Context Unit 1A145, it snoops the messages and writes the data to memory. In order to reduce the memory bandwidth, the context data is staged via a small cache. The allocation of tags has been done carefully so messages with common widths are grouped together and segregated from transient data. High-frequency transient data such as vertex parameters are not context switched as any isochronous rendering will set up the plane equations directly rather than via vertex values.

Context Unit 1A145 will only switch the context of units downstream from it. A full context switch (as may be required when changing from one application to another) is initiated by the driver using the ChangeContext message (or may happen automatically due to the circular buffer scheduling). The context saving of upstream units prior to Bin Manager Unit 1C113 are handled by Bin Manager Unit 1C113 (to prevent T&L state updates from causing premature flushing when binning). Units between Bin Manager Unit 1C113 and Context units will dump their context out, often using the same messages which loaded it in the first place, which Context Unit 1A145 will intercept and write out to memory. The Context Restore Unit (in the GPIO) will fetch the context data for the upstream units (loaded using their normal tags) while Context Unit 1A145 will handle the downstream units. A full context switch is expected to take less than 20 μS.

The isochronous stream has its own rasterizer. This rasterizer can only scan convert rectangles and is considerably simpler and smaller than the main rasterizer. Using a second rasterizer avoids the need to context switch the main rasterizer part way through a primitive which is very desirable as it is heavily pipelined with lots of internal state.

WID Subsystem

The WID (window ID) subsystem 1A150 basically handles pixel-level ownership testing when the shape of windows or the overlapping of windows is too complicated to be represented by the window clippers in Rasterizer Unit 1A140. The WID buffer (8-bits deep) also is used by the Video Subsystem to control per window double-buffering and color table selection.

Figure 1D:
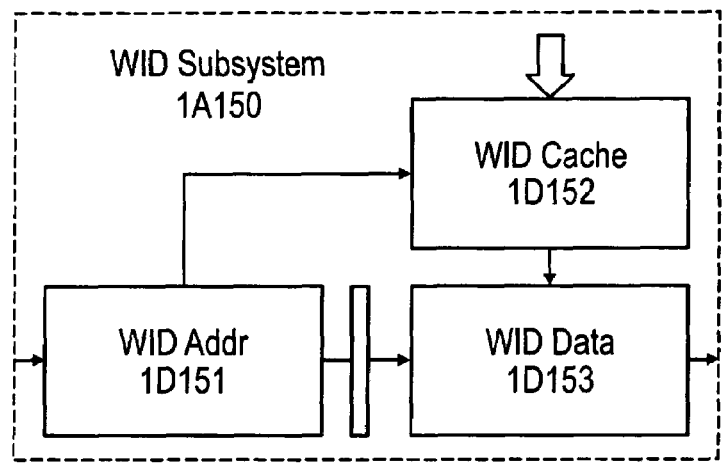
FIG. 1D is a block diagram of WID Subsystem 1A150.

The block diagram of the WID subsystem is shown in FIG. 1D. The subsystem operates in one of two modes:

Pixel Ownership mode. In this mode, the Tile message is modified to remove any pixels not owned by this context.

Directed Buffer mode. The pixels being displayed are a composite of up to 4 buffers, depending on the front/back and stereo state of each window. A 2D GDI operation has no idea about this and just wants to update the displayed pixels. In this mode, the Tile message is sent for each active buffer with the tile mask reduced to just include those pixels being displayed from that specific buffer (obviously no message is sent if no pixels are being displayed). WID Address Unit 1D151 calculates the address of the tile in the WID buffer and requests it from WID Cache 1D152. When WID testing is enabled, a Clear command is expanded into ClearTile commands for the clear region so WID testing can be applied to the individual tiles.

WID Cache 1D152, on a miss, will request the tile from memory and, when it is loaded, will do the Pixel Ownership test (assuming this is the mode of operation) and store the results of the test in the cache. Storing the test result instead of the WID values allows the cache to be 8 times smaller. The cache is organized as 8 super tiles (or 8K pixels) and is read-only so never needs to write stale data back to memory.

WID Data Unit 1D153 does little more than AND the result mask with the tile mask when pixel ownership testing is enabled. For directed buffer testing, it gets WID values for each pixel in the tile and constructs up to 4 Tile messages depending on which buffer(s) each pixel is being displayed in and sends them downstream with the appropriate color buffer selectors.

Visibility Subsystem

Figure 1E:
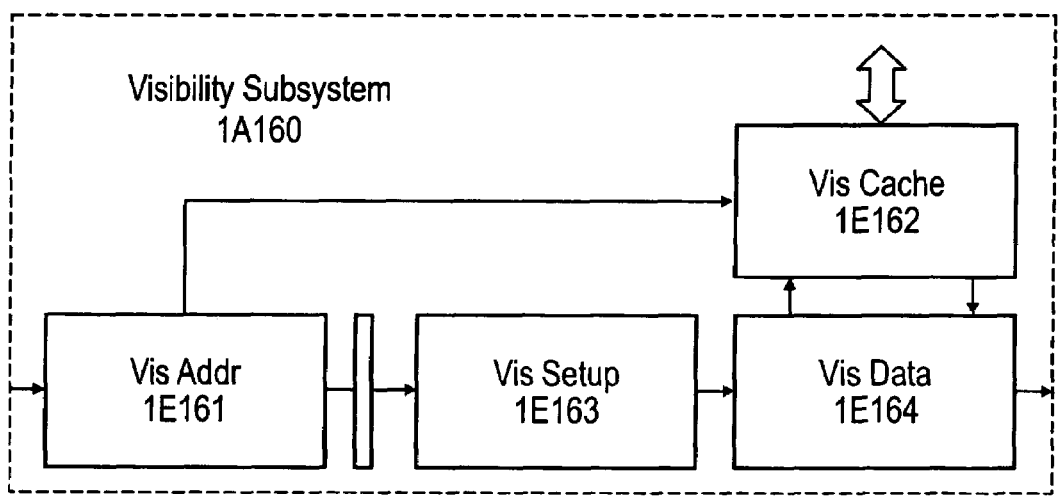
FIG. 1E is a block diagram of Visibility Subsystem 1A160.

Visibility Subsystem 1A160 allows visibility (i.e. depth) testing to be done before shading so the (expensive) shading can be avoided on any fragments that will be immediately discarded. The block diagram is shown in FIG. 1E.

Visibility Subsystem 1A160 replaces the router found in early chips that reordered the pipeline to get this same effect. Having a separate subsystem is more expensive than the router but has some significant advantages:

The router system had to be changed to be in fragment-depth order whenever alpha-testing was enabled so the early depth test was lost. Now the early depth test can be enabled in all cases, even if the visibility buffer cannot be updated in some modes.

The visibility testing happens at the fragment level and not at the sample level so the test rate does not decrease when antialiasing.

Conservative testing allows some shortcuts to be made that enhances performance without increasing gate cost.

It helps with the deferred rendering operation (when binning) as the first pass can be done really fast and produces no message output. This first pass can often be overlapped with the fragment shading of the previous bin It simplifies physical layout.

Vis Address Unit 1E161 calculates the address of the tile in the visibility buffer and issues this to Vis Cache Unit 1E162. Some commands such as Clear are also 'rasterized' locally.

Visibility Setup Unit 1E163 takes the coordinate information for the primitive (that the tile belongs to) and the derivative information provided by Primitive Setup Unit 1A130 and calculates the plane equation values (origin, dzdx, and dzdy gradients) for the depth value. These are passed to the Vis Data Unit 1E164 so the depth plane equation can be evaluated across the tile.

The Vis Cache holds 8 super tiles of visibility information and will read memory when a cache miss occurs. The miss also may cause a super tile to be written back to memory (just the enclosed tiles that have been dirtied). The size of the cache allows a binned region to be 128×64 pixels in size and normally no misses would occur during binning. Additional flags are present per tile to assist in order-independent transparency and edge tracking. The visibility buffer is a reduced spatial resolution depth buffer where each 4×4 sub tile is represented by a single-depth value (or two when multi-sample edge tracking to allow edges caused by penetrating faces to be detected). The lower spatial resolution reduces the cache size by 16× and allows a whole 8×8 tile to be checked with a modest amount of hardware. All of the data needed to process a tile are transferred in a single cycle to/from Vis Data Unit 1E164.

Vis Data Unit 1E164 uses the plane equation generated by Vis Setup Unit 1E163 and the vis buffer data provided by Vis Cache 1E162 for this tile to check if any of the 4×4 sub tiles are visible. Just the corners of each sub tile are checked, and only if all the corners are not visible will the sub tile be removed from the original tile. (A consequence of this is that a surface made up from small (i.e. smaller than a sub tile) primitives will not obscure a further primitive, even with front to back rendering.). When binning and multi-sampling, the minimum and maximum depth values per sub tile are held in the visibility buffer (for edge tracking) so that only those sub tiles with edges need to be multi-sampled. A local tile store is updated with the results, and this acts as an L0 cache to Vis Cache 1E162 to avoid the round trip read-after-write hazard synchronization when successive primitives hit the same tile.

Fragment Subsystem

The Fragment Subsystem consists of the Fragment Shading Unit, the Fragment Cache, the Texture Filter Arbiter and two Filter Pipes.

Figure 1F:
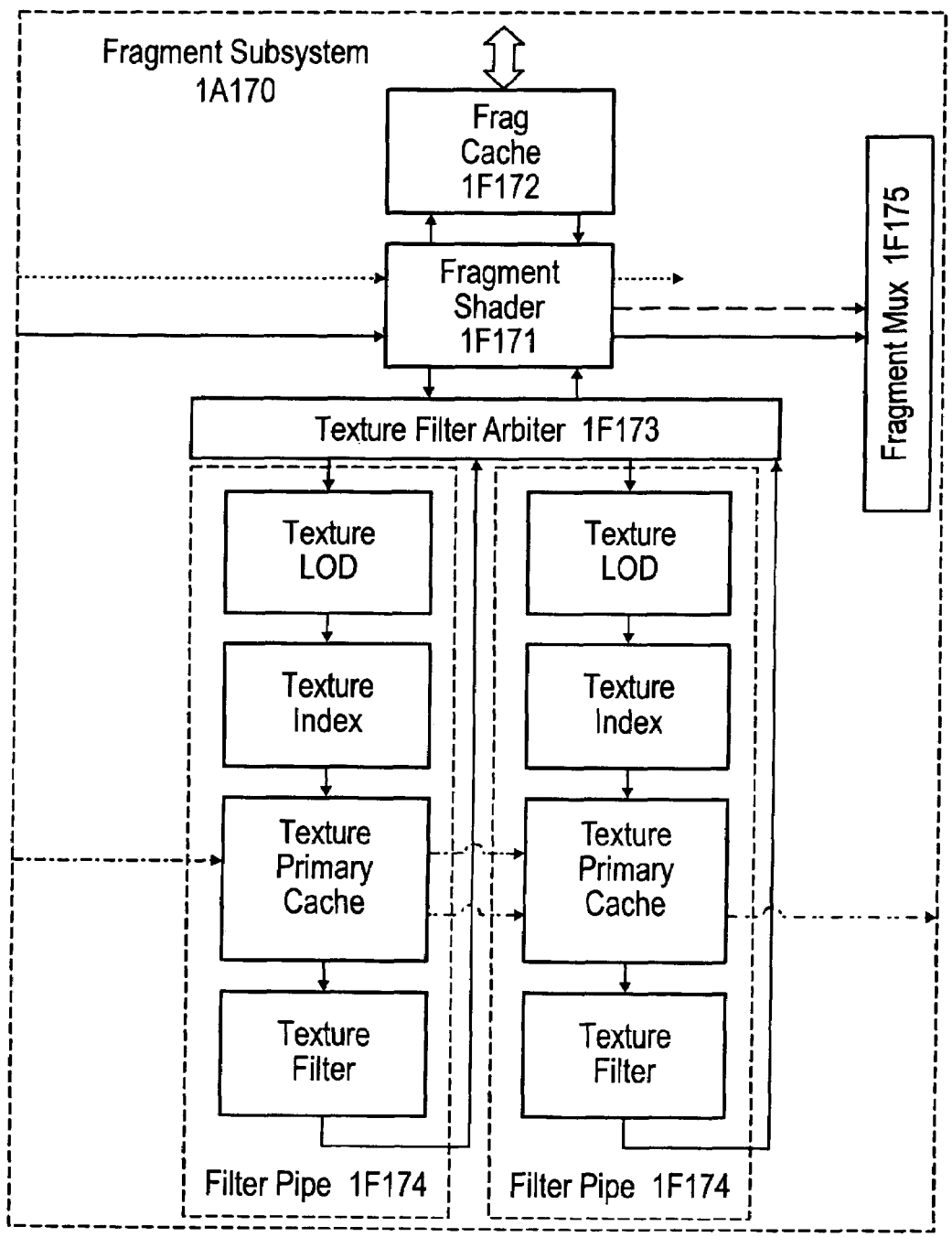
FIG. 1F is a block diagram of the first half of Fragment Subsystem 1A170.

The block diagram is shown in FIG. 1F.

The n fragment subsystems are replicated to achieve the desired performance. Logically, the subsystems are organized in parallel with each one handling every $n^{th}$ tile; however, the physical routing of the fan-out and fan-in networks makes this hard to do without excessive congestion. This is solved by daisy-chaining the fragment shaders in series and using suitable protocols to broadcast plane information, common state, to distribute work fairly and ensure the tile's results are restored to temporal order. From a programmer's viewpoint, there only appears to be one fragment subsystem.

The fragment subsystem is responsible for calculating the color of fragments, and this can involve arbitrary texture operations and computations for 2D and 3D operations. All blits are done as texture operations. (Pixel Subsystem 1A190 can do screen-aligned blits (i.e. copy from the back buffer to the front buffer); however, using texture operations should allow more efficient streaming of data.)

Fragment Shading Unit 1F171 will run a program (or shader) up to 4 times when it receives a Tile message—i.e. once per active sub tile. Typically, a shader will calculate a texture coordinate from some plane equations and maybe global data, request a texture access from one of the Filter Pipes, and when the texel data is returned combine it with other planes, values, or textures to generate a final color. The final color is sent as fragment data to Pixel Subsystem 1A190. A key part of the design of Fragment Shading Unit 1F171 is its ability to cope with the long latency from making a texture request to the results arriving back. This is done by running multithreads—each sub tile's shader is run as a separate thread, and when the thread accesses a resource that is not ready (the texture result is one such example), the thread is suspended, and the next available thread run. This way, the computational resources are kept busy, but given the short length of many of the shaders, the cost of thread-switching must be lightweight to allow switching every few cycles. Thread-switching does not involve any context save and restore operations—the registers used by each thread are unique and not shared. It is too expensive to provide each thread with a maximal set of resources (i.e. registers) so the resources are divided up among the threads, and the number of threads depends on the resource complexity of the shader. There can be a maximum of 16 threads, and they can work on one or more primitives.

Fragment Shading Unit 1F171 is an SIMD architecture with 16 scalar PE processors. Vector instructions can be efficiently encoded, and the main arithmetic elements include a floating point adder and a floating point multiplier. More complex arithmetic operations such as divide, power, vector magnitude, etc. are computed in the Filter Pipe. Format conversion can be done in-line on received or sent data. The instructions and global data are cached, and data can be read and written to memory (with some fixed layout constraints) so a variable stack is supported, thereby arbitrary, long, and complex programs to be implemented. Multi-word (and format) fragment data can be passed to Pixel Subsystem 1A190, and depth and/or stencil values generated for SD Subsystem 1A180.

Fragment Cache Unit 1F172 provides a common path to memory when instruction or global cache misses occur (the actual caches for these are part of Fragment Shading Unit 1F171) and a real cache for general memory accesses. These memory accesses are typically for variable storage on a stack, but can also be used to read and write buffers for non Tile based work.

Texture Filter Arbiter 1F173 will distribute texture and compute requests amongst multiple Filter Pipes (two in this case) and collate the results. Round robin distribution is used.

Fragment Mux Unit 1F175 takes the fragment data stream and message stream from the last Fragment Shading Unit and generates a fragment stream to the SD Data Unit 1H183, Pixel Data Unit 1I192, and a message stream to SD Address Unit 1H181.

Filter Pipe Subsystem

The main job of Filter Pipe Subsystem 1A170 is to take commands from Fragment Shading Unit 1F171 and do the required texture access and filtering operations. Much of the arithmetic machinery can also be used for evaluating useful, but comparatively infrequent, mathematical operations such as reciprocal, inverse square root, log, power, vector magnitude, etc.

Texture LOD Unit 1G171's main job is to calculate the perspectively correct texture coordinates and level of detail for the fragments passed from Fragment Shading Unit 1F171. The commands are for a sub tile's worth of processing so the first thing that is done is to serialize the fragments so the processing in this unit and the rest of the filter pipe is done one fragment at a time. Local differencing on 2×2 groups of fragments is done to calculate the partial derivatives and hence the level of detail.

Texture Index Unit 1G172 takes the u, v, w, LOD and cube face information for a fragment from the Texture LOD Unit 1G171 and converts it into the texture indices (i, j, k) and interpolation coefficients depending on the filter and wrapping modes in operation. Texture indices are adjusted if a border is present. The output of this unit is a record which identifies the 8 potential texels needed for the filtering, the associated interpolation coefficients, map levels, and a face number.

Primary Texture Cache Unit 1G173 uses the output record from Texture Index Unit 1G172 to look up in its cache directory whether the required texels are already in the cache and if so where. Texels which are not in the cache are passed to the request daisy chain so they can be read from memory (or the secondary cache) and formatted. The read texture data passes through this unit on the way to Texture Filter Unit 1G174 (where the data part of the cache is held) so the expedited loading can be monitored and the fragment delayed if the texels it requires are not present in the cache. Expedited loading of the cache and FIFO buffering (between the cache lookup and dispatch operations) allows for the latency for a round trip to the secondary cache without any degradation in performance; however, secondary cache misses will introduce stalls. (It is very likely that some texture access patterns (bilinear minification, for example) or simultaneous misses in all texture pipes will also cause some stalls. The impact of these could be reduced by making the latency FIFO deeper.)

The primary cache is divided into two banks, and each bank has 16 cache lines, each holding 16 texels in a 4×4 patch. The search is fully associative, and 8 queries per cycle (4 in each bank) can be made. The replacement policy is LRU, but only on the set of cache lines not referenced by the current fragment or fragments in the latency FIFO. The banks are assigned so even mip map levels or 3D slices are in one bank while odd ones are in the other. The search key is based on the texel's index and texture ID, not addresses in memory (saves having to compute 8 addresses). The cache coherency is intended only to work within a sub tile or maybe a tile, and never between tiles. (Recall that the tiles are distributed between pipes so it is very unlikely adjacent tiles will end up in the same texture pipe and hence Primary Texture Cache Unit 1G173.)

Texture Filter Unit 1G174 holds the data part of the primary texture cache in two banks and implements a trilinear lerp between the 8 texels simultaneously read from the cache. The texel data is always in 32-bit color format, and there is no conversion or processing between the cache output and lerp tree. The lerp tree is configured between the different filter types (nearest, linear, 1D, 2D, and 3D) by forcing the 5 interpolation coefficients to be 0.0, 1.0 or taking their real value. The filtered results can be further accumulated (with scaling) to implement anisotropic filtering before the final result is passed back to Fragment Shading Unit 1F171 (via Texture Filter Arbiter 1F173).

Texture Infrastructure

The commands and state data (texture object data) arrive at the Texture Address Unit via a request daisy chain that runs through all the Texture Primary Cache Units. The protocol on the request chain ensures all filter pipes are fairly served, and correct synchronization enforced when global state is changed.

Figure 1G:
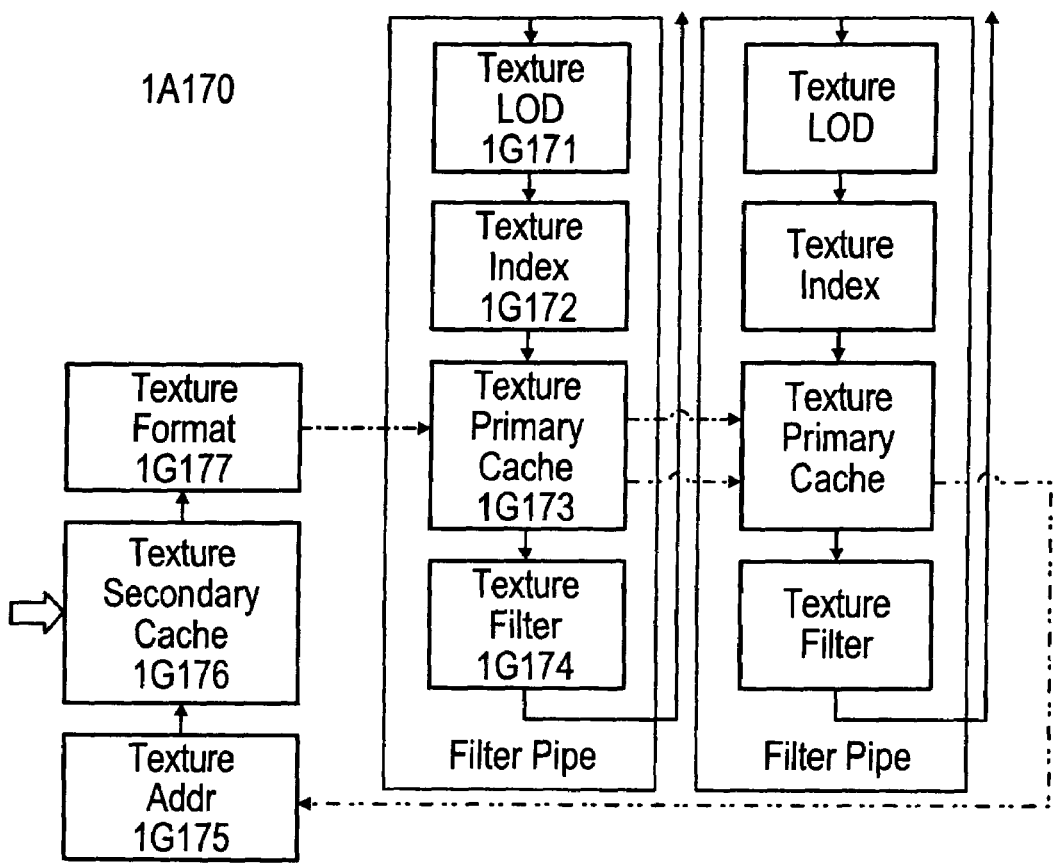
FIG. 1G is a block diagram of the second half of Fragment Subsystem 1A170.

The block diagram is shown in FIG. 1G.

Texture Address Unit 1G175 calculates the address in memory where the texel data resides. This operation is shared by all filter pipes (to save gates by not duplicating it), and in any case, it only needs to calculate addresses as fast as the memory/secondary cache can service them. The texture map to read is identified by a 5-bit texture ID, its coordinate (i, j, k), a map level, and a cube face. This together with local registers allows a memory address to be calculated. This unit only works in logical addresses, and the translation to physical addresses and handling any page faulting is done in the Memory Controller. The address of the texture map at each mip map level is defined by software and held in the texture object descriptor. The maximum texture map size is 8K×8K, and they do not have to be square (except for cube maps) and can be any width, height or depth. Border colors are converted to a memory access as the border color for a texture map is held in the memory location just before the texture map (level 0).

Once the logical address has been calculated, it is passed on to Secondary Texture Cache Unit 1G176. This unit will check if the texture tile is in the cache and if so will send the data to Texture Format Unit 1G177. If the texture tile is not present, then it will issue a request to the Memory Controller and, when the data arrives, update the cache and forward the data on. The cache lines hold a 256-byte block of data, and this would normally represent an 8×8 by 32 bpp tile, but could be some other format (8 or 16 bpp, YUV, or compressed). The cache is 4-way set associative and holds 64 lines (i.e. for a total cache size of 16 Kbytes), although this may change once some simulations have been done. Cache coherence with the memory is not maintained, and it is up to the programmer to invalidate the cache whenever textures in memory are edited. Secondary Texture Cache 1G176 capitalizes on the coherency between tiles or sub tiles when more than one texture is being accessed.

Texture Format Unit 1G177 receives the raw texture data from Texture Secondary Cache Unit 1G176 and converts it into the single, fixed-format Texture Filter Unit 1G174 works in (32 bpp 4×4 sub tiles). As well as handling the normal 1, 2, 3, or 4-component textures held as 8, 16, or 32 bits, it also does YUV 422 conversions (to YUV 444) and expands the DX-compressed texture formats. Indexed (palette) textures are not handled directly but are converted to one of the texture formats when they are downloaded.

The formatted texel data is distributed back to the originator of the request via the data daisy chain that runs back through all the filter pipes. If a filter pipe does not match as the original requester, it passes on the data, otherwise it removes it from the data chain.

The daisy chain method of distributing requests is used because it simplifies the physical layout of the units on the die and reduces wiring congestion.

SD Subsystem

SD Subsystem 1A180 is responsible for the depth and stencil processing operations. The depth value is calculated from the plane equation for each fragment (or each sample when multi sample antialiasing), or can be supplied by Fragment Shading Unit 1F171.

Figure 1H:
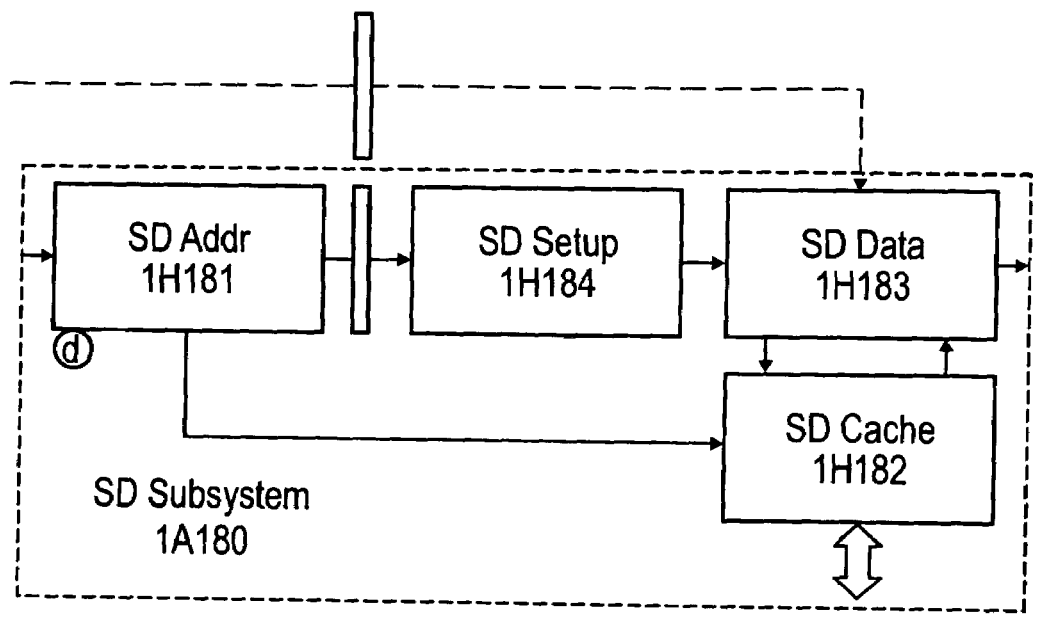
FIG. 1H is a block diagram of SD Subsystem 1A180.

A block diagram of SD Subsystem 1A180 is shown in FIG. 1H

SD Address Unit 1H181, in response to a SubTile message, will generate a tile/sub tile addresses and pass this to SD Cache 1H182. When multi-sample antialiasing is enabled, each sample will have its tile/sub tile address-generated and also output a SubTile message. All addresses are aligned on tile boundaries. SD Address Unit 1H181 will generate a series of addresses for the Clear command and also locally expand FilterColor and MergeTransparencyLayer commands when binning (if necessary).

SD Cache 1H182 has 8 cache lines, and each cache line can hold a screen-aligned super tile (32×32). The super tile may be partially populated with tiles, and the tiles are updated on a sub tile granularity. Flags per sub tile control fast clearing and order-independent transparency operations. The cache size is dictated by binning—the larger the better, but practical size constrains limit us to 128×64 pixels for aliased rendering or 32×32 pixels when 8 sample multi sampling is used. The fast clear operation sets all the fast clear flags in a super tile in one cycle (effectively clearing 4K bytes), and SD Data Unit 1H183 will substitute the clear value when a sub tile is processed. SD Data Unit 1H183 also will merge the old and new fragment values for partial sub tile processing.

SD Setup Unit 1H184 takes the coordinate information for the primitive (that the sub tile belongs to), the sample number, and the derivative information provided by Primitive Setup Unit 1A130 and calculates the plane equation values (origin, dzdx, and dzdy gradients) for the depth value. These are passed to SD Data Unit 1H183 so the depth plane equation can be evaluated across the sub tile. The sample number (when multi sampling) selects the jittered offset to apply to the plane origin.

SD Data Unit 1H183 implements the standard stencil and depth processing on 16 fragments (or samples) at a time. The SD buffer pixels are held in byte planar format in memory and are always 32-bits deep. Conversion to and from the external format of the SD buffer is done in this unit. The updated fragment values are written back to the cache, and the sub tile mask modified based on the results of the tests. Data is transferred for the 16 fragments 32 bits at a time to boost the small primitive processing rate.

Pixel Subsystem

Figure 1I:
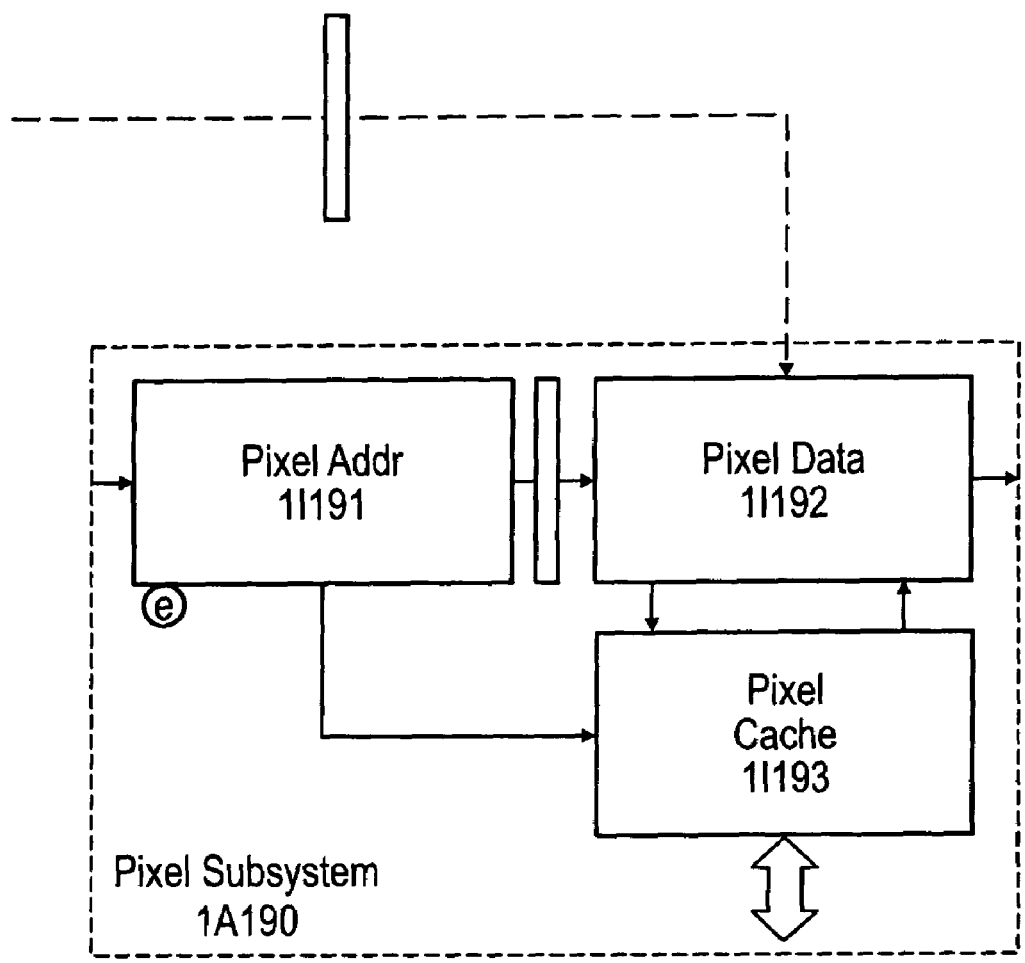
FIG. 1I is a block diagram of Pixel Subsystem 1A190.

Pixel Subsystem 1A190 is responsible for combining the color calculated in Fragment Shading Unit 1F171 with the color information read from the frame buffer and writing the result back to the frame buffer. Its simplest level of processing is a straight replace but could include antialiasing coverage, alpha blending, dithering, chroma-keying, and logical operations. More complex operations such as deeper pixel processing, accumulation buffer operations, multi-buffer operations, and multi-sample filtering can also be done. A block diagram of Pixel Subsystem 1A190 is shown in FIG. 1I.

Pixel Address Unit 1I191, in response to a SubTile message, will generate a number of tile addresses. Normally, this will be a single destination address, but could be multiple addresses for deep pixel or more advanced processing. The generation of addresses and the initiation of program runs in Pixel Data Unit 1I192 are controlled by a small user program. All addresses are aligned on tile boundaries. Pixel Address Unit 1I191 will generate a series of address for the Clear command and also locally expand FilterColor and MergeTransparencyLayer commands when binning (if necessary). Download data is synchronized here, and addresses automatically generated to keep in step.

Pixel Cache 1I193 is a subset of SD Cache 1H182 (see earlier). Pixel Cache 1I193 lacks the flags to control order-independent transparency, but has a 64-bit wide clear value register (to allow 64-bit color formats). Partial sub tile updates are handled by merging the old and new data in Pixel Data Unit 1I192.

The heart of this subsystem is Pixel Data Unit 1I192. This is a 4×4 SIMD array of float 16 processors. The interface to Pixel Cache 1I193 is a double-buffered, 32-bit register, and the fragment data interface is a FIFO-buffered, 32-bit register per SIMD element. The tile mask can be used and tested in the SIMD array, and the program storage (128 instructions) is generous enough to hold a dozen or so small programs. Programs will typically operate on one component at a time; however, to speed up the straight replace operation, a 'built-in Copy program can be run that will copy 32 bits at a time.

Pixel data received from Pixel Cache 1I193 can be interpreted directly as byte data or as float 16. No other formats are supported directly, but they can be emulated (albeit with a loss of speed) with a suitable program in the SIMD array.

In order to support some of the more complex operations such as multi-buffer, accumulation buffering, multi-sample filtering, etc., several programs can be run on the same tile with different frame buffer and global data before the destination tile is updated. The fragment color data can be held constant for some passes or changed, and each pass can write back data to Pixel Cache 1I193. Each SubTile message has an extra field to indicate which tile program (out of 8) to run and a field which holds the pass number (so that filter coefficients, etc. can be indexed). Any data to be carried over from one pass to the next is held in the local register file present in each SIMD element. Typically, the first tile program will do some processing (i.e. multiply the frame buffer color with some coefficient value) and store the results locally. The middle tile program will do the same processing, maybe with a different coefficient value, but add to the results stored locally. The last tile program will do the same processing, add to the results stored locally, maybe scale the results and write them to Pixel Cache 1I193. Multi-buffer and accumulation processing would tend to run the same program for each set of input data.

Data being transferred into or out of the SIMD array is done 32 bits at a time so the input and output buses connected to Pixel Cache 1I193 are 512 bits each. A small (4 entry) L0 cache is held in Pixel Data Unit 1I192 so the round trip via Pixel Cache 1I193 is not necessary for closely repeating sub tiles.

Host Out Unit

Host Out Unit 1A195 takes data forwarded on by Pixel Subsystem 1A190 via the message stream to be passed back to the host. Message filtering is done on any message reaching this point other than an upload data message; a sync message or a few other select messages are removed and not placed in the output FIFO. Statistics gathering and profile message processing can be done, and the results left directly in the host's memory.

Figure 1J:
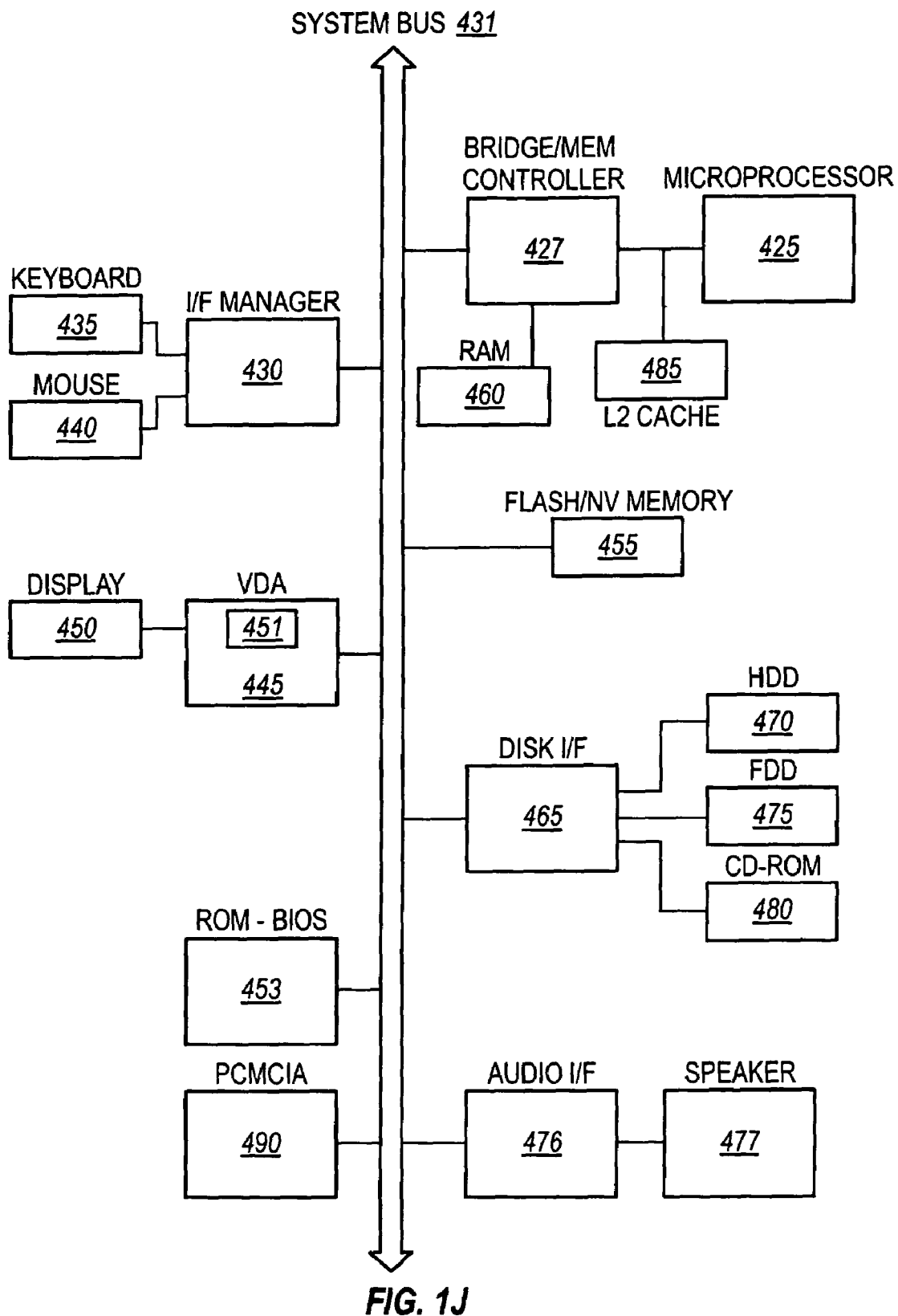
FIG. 1J is an overview of a computer system, with a rendering subsystem, which advantageously incorporates the disclosed graphics architecture.

FIG. 1J is an overview of a computer system, with a video display adapter 445 in which the embodiments of the present inventions can advantageously be implemented. The complete computer system includes in this example: user input devices (e.g. keyboard 435 and mouse 440); at least one microprocessor 425 which is operatively connected to receive inputs from the input devices, across e.g. a system bus 431, through an interface manager chip 430 which provides an interface to the various ports and registers; the microprocessor interfaces to the system bus through perhaps a bridge controller 427; a memory (e.g. flash or non-volatile memory 455, RAM 460, and BIOS 453), which is accessible by the microprocessor; a data output device (e.g. display 450 and video display adapter card 445) which is connected to output data generated by the microprocessor 425; and a mass storage disk drive 470 which is read-write accessible, through an interface unit 465, by the microprocessor 425.

Optionally, of course, many other components can be included, and this configuration is not definitive by any means. For example, the computer may also include a CD-ROM drive 480 and floppy disk drive ("FDD") 475 which may interface to the disk interface controller 465. Additionally, L2 cache 485 may be added to speed data access from the disk drives to the microprocessor 425, and a PCMCIA 490 slot accommodates peripheral enhancements. The computer may also accommodate an audio system for multimedia capability comprising a sound card 476 and a speaker(s) 477.

According to a disclosed class of innovative embodiments, there is provided: A method for rendering 3D graphics, comprising the steps of: a) separating a display space into multiple first bins, each containing multiple pixels of said display space; b) for each said first bin, defining a respective second bin which contains all the pixels in said respective first bin; and c) when a primitive is sought to be rendered, allocating said primitive to said first bins if said primitive is opaque, or to said second bins if said primitive is not opaque.

According to a disclosed class of innovative embodiments, there is provided: A method for rendering 3D graphics, comprising the steps of: a) separating a display space into multiple first bins, each containing multiple pixels of said display space; b) for each said first bin, defining a respective second bin which contains all the pixels in said respective first bin; c) when a primitive is sought to be rendered, allocating said primitive to said first bins or to said second bins, but not to both, depending on at least one attribute of the primitive; and d) rendering ones of said first bins before ones of said second bins.

According to a disclosed class of innovative embodiments, there is provided: A method for rendering 3D graphics, comprising: a) a step for assigning primitives either a to first set or to a second set of bins before rendering, based upon at least one attribute of the primitives; b) a step for rendering ones of said primitives which are assigned to said first set of bins; and c) a subsequent step for rendering ones of said primitives which are assigned to said second set of bins; wherein said steps b) and c) perform different operations.

According to a disclosed class of innovative embodiments, there is provided: A method for rendering 3D graphics, comprising: a) a step for assigning more opaque ones of the primitives which fall within a given portion of display area to a respective one of a first set of bins, and for assigning less opaque ones of the primitives which fall within said given portion of display area to a respective one of a second set of bins; b) a step for rendering ones of said primitives, within said given portion of display area, which are assigned to said first set of bins; and c) a subsequent step for rendering ones of said primitives, within said given portion of display area, which are assigned to said second set of bins; wherein said step c), but not said step b), uses multipass rendering.

According to a disclosed class of innovative embodiments, there is provided: A computer system for 3D graphics rendering comprising: a host processor; and a 3D graphics accelerator comprising: a device for segregating opaque primitives from non-opaque primitives before rendering; wherein said opaque primitives are linked to a first set of bins, and said non-opaque primitives are linked to a second set of bins; and wherein said device automatically segregates said primitives without requiring the action of an application.

According to a disclosed class of innovative embodiments, there is provided: A computer system for 3D graphics rendering comprising: a host processor; and a 3D graphics accelerator comprising: a means for segregating primitives before rendering by linking said primitive to either a first set or a second set of bins, but not both, based upon at least one attribute of the primitives; wherein said device automatically segregates said primitives without requiring the action of an application.

According to a disclosed class of innovative embodiments, there is provided: A computer system for 3D graphics rendering comprising: a host processor; and a 3D graphics accelerator comprising: a bin data base that allows opaque and non-opaque primitives to be segregated automatically into pairs of bins covering the same bin rectangle on the screen; and a rendering hardware that will render the opaque bin first and the non-opaque bin second; wherein said non-opaque bin is rendered repeated using a depth peeling algorithm until all the non-opaque layers have been rendered.

DEFINITIONS

Following are short definitions of the usual meanings of some of the technical terms which are used in the present application. (However, those of ordinary skill will recognize whether the context requires a different meaning.) Additional definitions can be found in the standard technical dictionaries and journals.

A "primitive" or "fragment" is any fundamental geometric form, such as a triangle, used for building 3-D computer graphics.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Many of the requirements of 3D graphics processing are quite different from those of earlier attempts to create computer graphics. However, as the evolution of computers and of visual interfaces continues, it is expected that many of the disclosed innovations will be directly applicable to systems which go beyond 3D graphics. For example, such contemplated further applications can include stereoscopic graphics systems, systems which provide 4D processing (e.g. for motion filtering of video streams), and/or anamorphic image transformation.

In the presently preferred embodiment, primitives which are fully opaque are segregated from objects which are not fully opaque. However, in one contemplated class of alternatives, a threshold of less than 100% can be set, so that, for example, a primitive which is 99% opaque will be treated as opaque.

In the presently preferred embodiment, primitives are segregated into one of two bins. However, in one contemplated class of alternatives, some primitive types, e.g. 2D glyphs, could be assigned to both first and second bins.

In the presently preferred embodiment, the opaque and non-opaque bins have a 1:1 ratio. However, in one contemplated class of embodiments, the opaque and non-opaque bins do not necessarily have a 1:1 correlation. For example, the ratio of opaque to non-opaque bins may be 4:1 or vice versa.

In another class of embodiments, the display space is 1600×1200 pixels. Of course, other display space sizes are possible.

In another class of embodiments, the bins are 64×64 pixels. Of course, other bin sizes are possible.

Note that with regard to the disclosed inventions, a primitive can be any geometric form such as a line, a triangle, or a rectangle. Note also that the disclosed inventions can be used to segregate primitives that are antialiased, as well as those that are not antialiased. Additional general background, which helps to show variations and implementations, may be found in the following publications, all of which are hereby incorporated by reference: Advances in Computer Graphics (ed. Enderle 1990); Angel, Interactive Computer Graphics: A Top-Down Approach with OpenGL; Angell, High-Resolution Computer Graphics Using C (1990); the several books of "Jim Blinn's Corner" columns; Computer Graphics Hardware (ed. Reghbati and Lee 1988); Computer Graphics: Image Synthesis (ed. Joy et al.); Eberly: 3D Game Engine Design (2000); Ebert: Texturing and Modelling 2.ed. (1998); Foley et al., Fundamentals of Interactive Computer Graphics (2.ed. 1984); Foley, Computer Graphics Principles & Practice (2.ed. 1990); Foley, Introduction to Computer Graphics (1994); Glidden: Graphics Programming With Direct3D (1997); Hearn and Baker, Computer Graphics (2.ed. 1994); Hill: Computer Graphics Using OpenGL; Latham, Dictionary of Computer Graphics (1991); Tomas Moeller and Eric Haines, Real-Time Rendering (1999); Michael O'Rourke, Principles of Three-Dimensional Computer Animation; Prosise, How Computer Graphics Work (1994); Rimmer, Bit Mapped Graphics (2.ed. 1993); Rogers et al., Mathematical Elements for Computer Graphics (2.ed. 1990); Rogers, Procedural Elements For Computer Graphics (1997); Salmon, Computer Graphics Systems & Concepts (1987); Schachter, Computer Image Generation (1990); Watt, Three-Dimensional Computer Graphics (2.ed. 1994, 3.ed. 2000); Watt and Watt, Advanced Animation and Rendering Techniques: Theory and Practice; Scott Whitman, Multiprocessor Methods For Computer Graphics Rendering; the SIGGRAPH Proceedings for the years 1980 to date; and the IEEE Computer Graphics and Applications magazine for the years 1990 to date. These publications (all of which are hereby incorporated by reference) also illustrate the knowledge of those skilled in the art regarding possible modifications and variations of the disclosed concepts and embodiments, and regarding the predictable results of such modifications.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A method for rendering 3D graphics, comprising the steps of:
    a. separating a display space into multiple first bins by a graphics accelerator, each containing multiple pixels of said display space;
    b. for each said first bin, defining a respective second bin which contains all the pixels in said respective first bin; and
    c. when a primitive is sought to be rendered, allocating said primitive to said first bins if said primitive is opaque, or said second bins if said primitive is not opaque.

2. The method of claim 1, wherein said first bins are each rendered in a single pass, and ones of said second bins are rendered in multiple passes.

3. The method of claim 1, wherein said step of allocating said primitive to first bins or to said second bins is performed automatically without requiring the action of an application.

4. The method of claim 1, wherein said display space is 1600×1200 pixels.

5. The method of claim 1, wherein said first and second bins are 64×64 pixels.

6. The method of claim 1, wherein said primitive is a triangle or a line.

7. The method of claim 1, wherein said primitive may be antialiased or not.

8. A computer system which implements the method of claim 1.

9. A hardware module which implements the method of claim 1.

10. A method for rendering 3D graphics, comprising the steps of:
 a. separating a display space into multiple first bins by a graphics accelerator, each containing multiple pixels of said display space;
 b. for each said first bin, defining a respective second bin which contains all the pixels in said respective first bin; and
 c. when a primitive is sought to be rendered, allocating said primitive to said first bins or to said second bins, but not to both, depending on at least one attribute of the primitive; and
 d. rendering ones of said first bins before ones of said second bins.

11. The method of claim 10, wherein said attribute is transparency.

12. The method of claim 10, wherein said first bins are each rendered in a single pass, and ones of said second bins are rendered in multiple passes.

13. The method of claim 10, wherein said step of allocating said primitive to first bins or to said second bins is performed automatically without requiring the action of an application.

14. The method of claim 10, wherein said display space is 1600×1200 pixels.

15. The method of claim 10, wherein said first and second bins are 64×64 pixels.

16. The method of claim 10, wherein said primitive is a triangle or a line.

17. The method of claim 10, wherein said primitive may be antialiased or not.

18. A computer system which implements the method of claim 10.

19. A hardware module which implements the method of claim 10.

20. A method for rendering 3D graphics, comprising:
 a. a step for assigning primitives by a graphics accelerator either to a first set or to a second set of bins before rendering, based upon at least one attribute of the primitive;
 b. a step for rendering ones of said primitives which are assigned to said first set of bins; and
 c. a subsequent step for rendering ones of said primitives which are assigned to said second set of bins; and
 wherein said steps b) and c) perform different operations.

21. The method of claim 20, wherein said attribute is transparency.

22. The method of claim 20, further comprising a step for rendering:
 wherein the primitives in said first set of bins are each rendered in a single pass, and the primitives in said second bins are rendered in multiple passes.

23. The method of claim 20, further comprising a step for rendering:
 wherein the primitives in said first set of bins are each rendered before the primitives in said second bins.

24. The method of claim 20, wherein said first and second bins are 64×64 pixels.

25. The method of claim 20, wherein said primitive is a triangle or a line.

26. The method of claim 20, wherein said primitive may be antialiased or not.

27. A computer system which implements the method of claim 20.

28. A hardware module which implements the method of claim 20.

29. A method for rendering 3D graphics, comprising:
 a. a step for assigning by a graphics accelerator more opaque ones of the primitives which fall within a given portion of display area to a respective one of a first set of bins, and for assigning less opaque ones of the primitives which fall within a given portion of display area to a respective one of a second set of bins;
 b. a step for rendering ones of said primitives, within said given portion of display area, which are assigned to said first set of bins; and
 c. a subsequent step for rendering ones of said primitives, within said given portion of display area, which are assigned to said second set of bins;
 wherein said step c), but not step b), uses multipass rendering.

30. The method of claim 29, further comprising a step for rendering;
 wherein the primitives in said first set of bins are each rendered in a single pass, and the primitives in said second bins are rendered in multiple passes.

31. The method of claim 29, further comprising a step for rendering:
 wherein the primitives in said first set of bins are each rendered before the primitives in said second bins.

32. The method of claim 29, wherein said display space is 1600×1200 pixels.

33. The method of claim 29, wherein said first and second bins are 64×64 pixels.

34. The method of claim 29, wherein said primitive is a triangle or a line.

35. The method of claim 29, wherein said primitive may be antialiased or not.

36. A computer system which implements the method of claim 29.

37. A hardware module which implements the method of claim 29.

38. A computer system for 3D graphics rendering comprising:
 a host processor; and
 a 3D graphics accelerator comprising:
  a device for segregating opaque primitives from non-opaque primitives before rendering;
  wherein said opaque primitives are linked to a first set of bins, and said non-opaque primitives are linked to a second set of bins; and
  wherein said device automatically segregates said primitives without requiring the action of an application.

39. The system of claim 38, wherein said graphics accelerator further comprising a device for rendering:

wherein said opaque primitives are rendered in a single pass, and said non-opaque primitives are rendered in multiple passes.

40. The system of claim 38, wherein said graphics accelerator further comprising a device for rendering:
wherein said opaque primitives in said first set of bins are each rendered before a the primitives in said second bins.

41. The system of claim 38, wherein said first and second bins are 64×64 pixels.

42. The system of claim 38, wherein said primitive is a triangle or a line.

43. The system of claim 38, wherein said primitive may be antialiased or not.

44. A computer system for 3D graphics rendering comprising:
a host processor; and
a 3D graphics accelerator comprising:
a means for segregating primitives before rendering by linking said primitives to either a first set or a second set of bins, but not both, based upon at least one attribute of the primitives;
wherein said device automatically segregates said primitives without requiring the action of an application.

45. The system of claim 44, wherein said attribute is transparency.

46. The system of claim 44, wherein said graphics accelerator further comprising a means for rendering:
wherein the primitives linked to said first set of bins are each rendered in a single pass, and the primitives linked to said second bins are rendered in multiple passes.

47. The system of claim 44, wherein said graphics accelerator further comprising a means for rendering:
wherein the primitives linked to in said first set of bins are each rendered before the primitives linked to said second bins.

48. The system of claim 44, wherein said first and second bins are 64×64 pixels.

49. The system of claim 44, wherein said primitive is a triangle or a line.

50. The system of claim 44, wherein said primitive may be antialiased or not.

51. A computer system for 3D graphics rendering comprising:
a host processor; and
a 3D graphics accelerator comprising:
a bin data base that allows opaque and non-opaque primitives to be segregated automatically into pairs of bins covering the same bin rectangle on the screen; and
rendering hardware that will render the opaque bin first and the non-opaque bin second;
wherein said non-opaque bin is rendered repeatedly using a depth peeling algorithm until all the non-opaque layers have been rendered.

52. The system of claim 51, wherein said first and second bins are 64×64 pixels.

53. The system of claim 51, wherein said primitive is a triangle or a line.

54. The system of claim 51, wherein said primitive may be antialiased or not.

55. A graphics rendering module, comprising:
a database comprising, for each separate area of display space, two bin assignments; wherein a first one of said bin assignments records more opaque ones of primitives which affect said area of display space, and a second one of said bin assignments records less opaque ones of primitives which affect said area of display space; and
a rendering hardware which, for said area of display space,
renders said more opaque ones of said primitives in accordance with said first bin assignments, using single-pass rendering, and thereafter
renders said less opaque ones of said primitives in accordance with said second bin assignments, using multi-pass rendering.

56. The module of claim 55, wherein said first and second bins are 64×64 pixels.

57. The module of claim 55, wherein said primitive is a triangle or a line.

58. The module of claim 55, wherein said primitive may be antialiased or not.

59. The module of claim 55, wherein said less opaque ones of said primitives in accordance with said second bin assignments are rendered repeatedly using a depth peeling algorithm until all the non-opaque layers have been rendered.

* * * * *